United States Patent
Avraham et al.

(10) Patent No.: US 11,901,932 B2
(45) Date of Patent: Feb. 13, 2024

(54) METHOD AND APPARATUS FOR CANCELLING INTERFERENCE IN A TRANSCEIVER

(71) Applicant: INTEL CORPORATION, Santa Clara, CA (US)

(72) Inventors: Oren Ezra Avraham, Givat Shmuel (IL); Josef Holzleitner, Wels (AT); Ram Sunil Kanumalli, Linz (AT); Harald Pretl, Schwertberg (AT); Silvester Sadjina, Linz (AT); Werner Schelmbauer, Steyr (AT)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 17/595,834

(22) PCT Filed: May 26, 2020

(86) PCT No.: PCT/US2020/034466
§ 371 (c)(1),
(2) Date: Nov. 25, 2021

(87) PCT Pub. No.: WO2020/263478
PCT Pub. Date: Dec. 30, 2020

(65) Prior Publication Data
US 2022/0321163 A1 Oct. 6, 2022

(30) Foreign Application Priority Data
Jun. 26, 2019 (DE) .......................... 102019117264.0

(51) Int. Cl.
*H04B 1/525* (2015.01)
*H04B 1/40* (2015.01)

(52) U.S. Cl.
CPC .................................. *H04B 1/525* (2013.01)

(58) Field of Classification Search
CPC . H04B 1/10; H04B 1/109; H04B 1/40; H04B 1/44; H04B 1/48; H04B 2001/485; H04B 1/50; H04B 1/525; H04B 15/00
See application file for complete search history.

(56) References Cited

U.S. PATENT DOCUMENTS 6,384,589 B1   5/2002   Gumm et al.
8,805,298 B2 * 8/2014   McCallister ........... H04B 1/525
                                              455/550.1

(Continued)

FOREIGN PATENT DOCUMENTS

KR   10-2009-0088915 A   8/2009
KR   10-2010-0058931 A   6/2010

OTHER PUBLICATIONS

Ahmed Elmaghraby et al., 'A Mixed-Signal Technique for TX-Induced Modulated Spur Cancellation in LTE-CA Receivers', IEEE Transactions on Circuits and Systems-I: Regular Papers, ResearchGate, Oct. 18, 2018 [retrieved on Aug. 6, 2020]. Retrieved from the Internet: <https://www.researchgate.net/publication/323231445>; abstract: pp. 1-12; and figures 1, 4, 15.

*Primary Examiner* — Quochien B Vuong
(74) *Attorney, Agent, or Firm* — SPL Patentanwälte PartG mbB; Yong Beom Hwang

(57) ABSTRACT

A method and apparatus for cancelling an interference in a received signal. The apparatus may include a plurality of receivers and one or more transmitters. The first receiver is configured to process a received signal. The first receiver includes a mixer to down-convert the received signal using a first local oscillator signal having a first frequency. The received signal includes a wanted signal and an unwanted signal. The second receiver is configured to process the received signal and generate an interference reference signal. The second receiver includes a mixer to down-convert the received signal using a second local oscillator signal (Continued)

having a second frequency. The apparatus includes an interference canceller configured to cancel, in a digital domain, at least in part interference caused by non-linear characteristics of the first receive chain in a presence of the unwanted signal from the down-converted received signal by the first receive chain.

19 Claims, 15 Drawing Sheets

(56) References Cited

U.S. PATENT DOCUMENTS

| | | | |
|---|---|---|---|
| 9,065,508 B2* | 6/2015 | Baudin | H04B 1/123 |
| 9,160,584 B1 | 10/2015 | Kavousian et al. | |
| 9,590,647 B2* | 3/2017 | Preyler | H03M 3/33 |
| 10,491,360 B2* | 11/2019 | Liu | H04B 1/525 |
| 2020/0350948 A1* | 11/2020 | Gurbuz | H04B 1/04 |

* cited by examiner

METHOD AND APPARATUS FOR CANCELLING INTERFERENCE IN A TRANSCEIVER

FIELD

Examples relate to interference cancellation in a transceiver, more particularly a method and apparatus for interference cancellation in a transceiver using mixed-signal interference cancellation.

BACKGROUND

In order to meet the demands for high data rates and throughputs in mobile communications the Third Generation Partnership Project (3GPP) has implemented carrier aggregation (CA). A carrier aggregation is a technology that aggregates two or more component carriers for uplink and/or downlink transmissions to increase a data throughput. A carrier aggregation may be implemented intra or inter frequency bands.

BRIEF DESCRIPTION OF THE FIGURES

Some examples of apparatuses and/or methods will be described in the following by way of example only, and with reference to the accompanying figures, in which

FIG. 1 shows an example structure of an apparatus configured to cancel or mitigate interference caused by the transmitter-induced third order counter intermodulation distortion (CIMD3) product and/or the IMD2 in accordance with one example;

DETAILED DESCRIPTION

Figure 1:
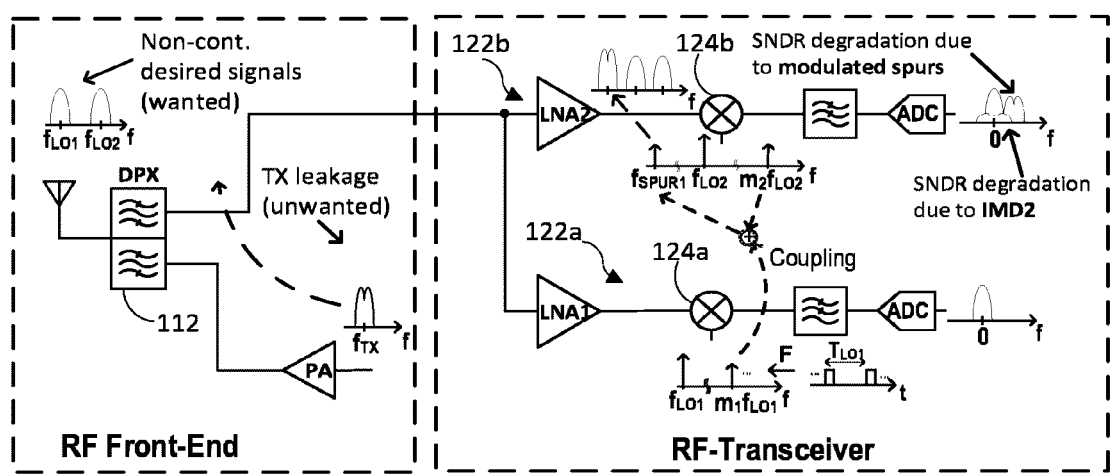
FIG. 1 illustrates an example case of interference induced in a received signal due to a modulated spur and a second order intermodulation distortion (IMD2)

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Hereinafter, the terms "interfering signal," "unwanted signal," and "blocker signal" will be used interchangeably. The terms "wanted signal" and "desired signal" will be used interchangeably. The terms "receive chain" and "receive path" will be used interchangeably and the terms "transmit chain" and "transmit path" will be used interchangeably. Terms "receiver" or "micro-receiver" may also be used interchangeably with "receive chain" or "receive path," and the term "transmitter" may be used interchangeably with "transmit chain" or "transmit path."

Various impairments may be incurred in a received signal in a wireless transceiver. FIG. 1 illustrates an example case of interference induced in a received signal due to a modulated spur and a second order intermodulation distortion (IMD2). The transceiver 100 in FIG. 1 operates in a dual downlink CA scenario such that the transceiver 100 transmits uplink transmissions via an uplink carrier (centered at $f_{TX}$) and receives downlink transmissions via two downlink carriers (centered at $f_{LO1}$ and $f_{LO2}$). Due to a limited isolation of a duplexer 112, the transmit signal may be leaked into a receive chain(s) 122a, 122b as shown in FIG. 1. The leaked transmit signal becomes one of the strong interfering signals. Other interfering signals that may be present in the received signal include signals existing due to the integration of Wi-Fi co-existence, 5G New Radio (NR), dual receive dual standby (DRDS), license assisted access (LAA), or the like.

In order to support different CA scenarios a multitude of local oscillator (LO) signals are needed in a transceiver. The number of LO signals present in the RF transceiver chip and the overall complexity of the analog circuitry is driven by this increasing number of CA modes. Device non-linearities on the LO signal distribution paths in a transceiver and cross-talk between the LO signal paths, or non-perfect isolation in the radio frequency (RF) front-end components (e.g. duplexers, antennas, etc.) may lead to generation of spurs. The spur frequency due to the LO-LO cross-talk is a harmonic combination of the LO signals. For example, in FIG. 1, the first LO signal being used in the first receive chain 122a may be combined with the second LO signal being used in the second receive chain 122b, and a LO spur (e.g. at $f_{SPUR1}$) may be incurred by the harmonic combination of the first LO signal and the second LO signal (e.g by a combination of $m_1 f_{LO1}$ and $m_2 f_{LO2}$). In the mixing stage at a mixer 124b in the second receive chain 122b, this LO spur may down-convert the interfering signals (e.g. the leaked transmit signal or other unwanted signals) to baseband. An interfering signal down-converted by an LO spur is called a modulated spur. With the increasing number of CA combinations such as in LTE and 5G, the probability and the severity of the modulated spurs increase drastically.

In addition, strong interferers and receiver (RX) non-linearity can cause receiver desensitization due to the IMD2. IMD2 may be caused by the non-linear behavior of components in the receiver (e.g. a mixer 124a, 124b) and strong blocker signals appearing at the input of the receiver.

The modulated spurs overlaying with the desired baseband signal and the IMD2 cause severe degradation of the performance of the receiver by degrading the signal-to-noise-and-distortion-ratio (SNDR) of the desired signal.

Figure 2:
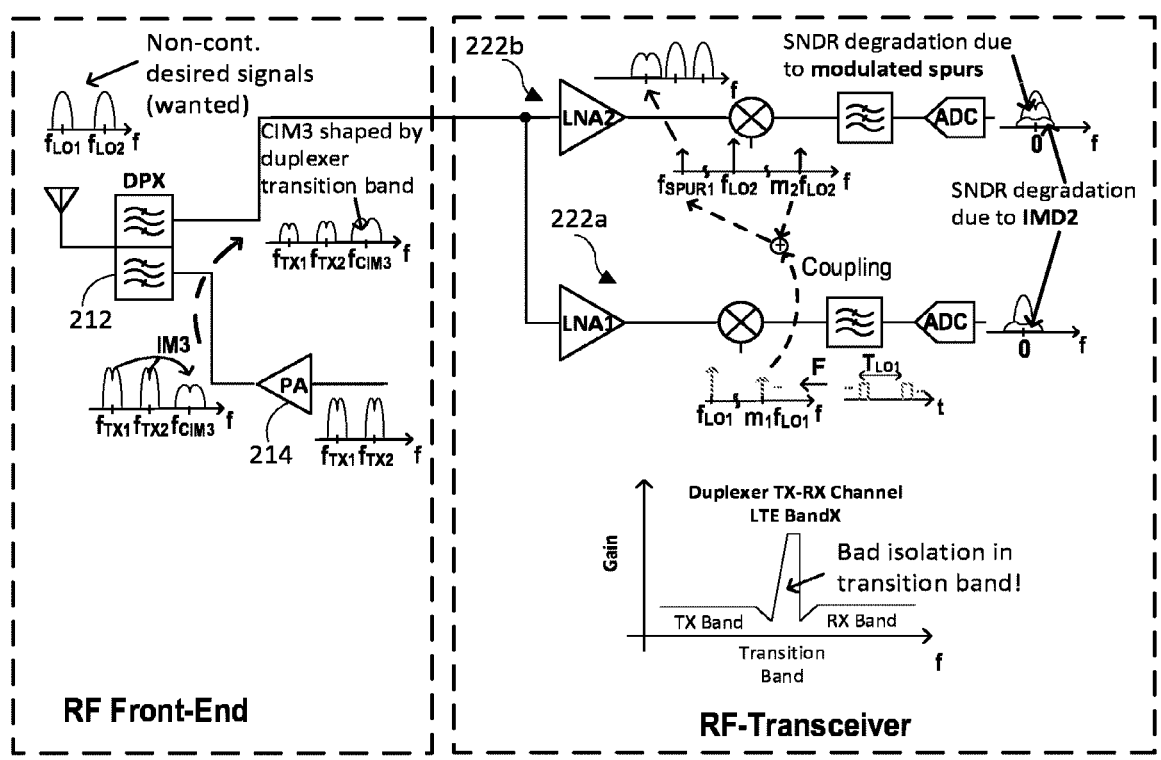
FIG. 2 illustrates another example case of interference induced in a received signal due to a modulated spur caused by a third order counter intermodulation and an IMD2.

FIG. 2 illustrates another example case of interference induced in a received signal due to a modulated spur caused by a third order counter intermodulation and an IMD2. The transceiver 200 in FIG. 2 operates in a dual uplink and downlink non-contiguous CA scenario such that the transceiver 200 transmits uplink transmissions via two uplink carriers (centered at $f_{TX1}$ and $f_{TX2}$) and receives downlink transmissions via two downlink carriers (centered at $f_{LO1}$ and $f_{LO2}$).

Intermodulation distortion products may be generated in the transmitter (TX) as well. The two carriers (centered at $f_{TX1}$ and $f_{TX2}$) in the transmitter pass through a power amplifier 214, which is a non-linear device, and a third order counter intermodulation distortion (CIMD3) products (centered at $f_{CIM3}$) may be generated. This CIMD3 product may fall near a frequency of the transition band of the duplexer 212. The transmit band and the receive band are separated by a transition band. The isolation of the duplexer 212 between a transmitter and a receiver is low in the transition band frequency range. Therefore, this CIMD3 product may be present at the input of the receive chains 222a, 222b (e.g. at the input of low noise amplifiers (LNAs)). The third order intermodulation product shaped by the duplexer transition band in addition to the leaked transmit signal may be present at the input of the receive chains 222a, 222b. An LO spur (e.g. incurred in the second LO signal due to the coupled first LO signal, as described above) may down-convert this CIMD3 product to baseband which may then overlay with the wanted signal in baseband. The IMD2 may also degrade the SNDR of the desired signal.

Figure 3:
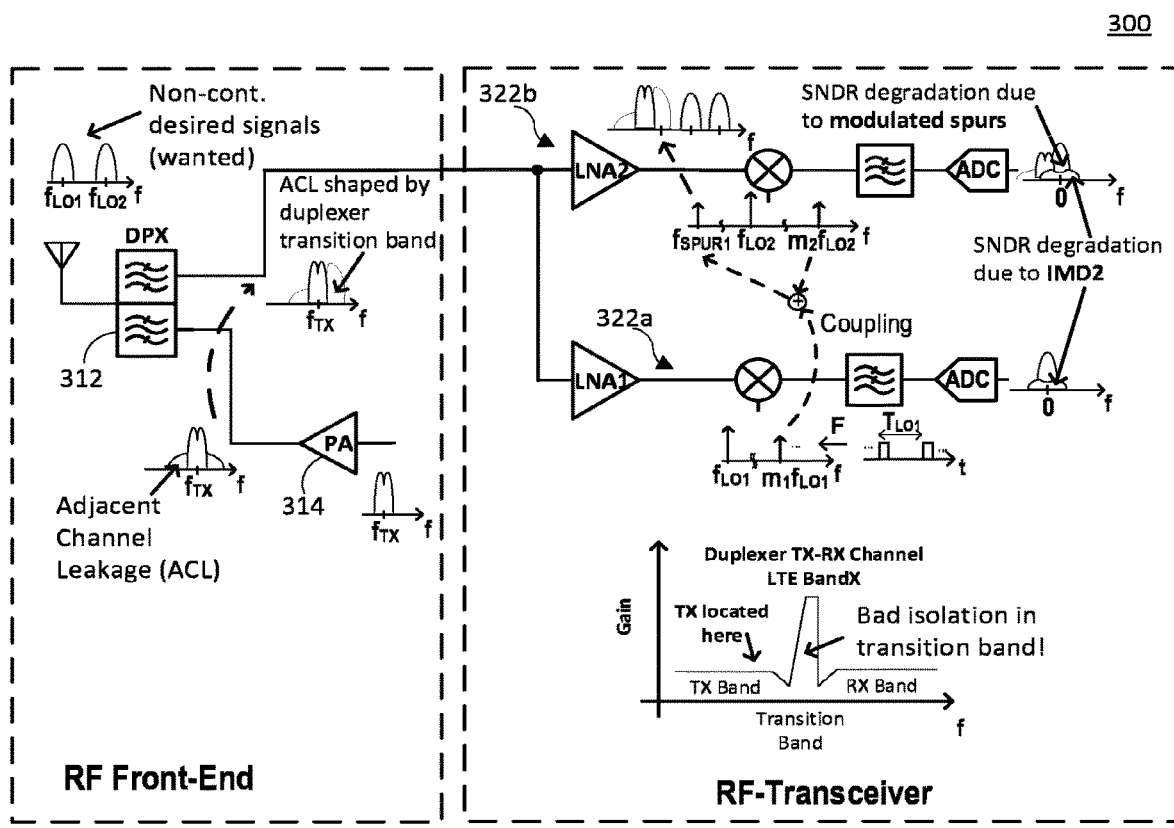
FIG. 3 illustrates another example case of interference induced in a received signal due to an adjacent channel leakage (ACL) and an IMD2.

FIG. 3 illustrates another example case of interference induced in a received signal due to an adjacent channel leakage (ACL) and an IMD2. The transceiver 300 in this example operates in a dual downlink non-contiguous CA scenario such that the transceiver 300 transmits uplink transmission via an uplink carrier and receives downlink transmissions via two downlink carriers.

Due to the non-linear behavior of a power amplifier 314 in a transmitter an ACL may be generated. An ACL is a leakage of a transmit power into an adjacent frequency channel from a transmitted signal. If the transmit signal is located near the edge of the transmit band the ACL may appear in the transition band of the duplexer 312. Because of the weak isolation of the duplexer 312 in the transition band, the ACL (shaped by the duplexer transition band) may be present at the input of the LNA in the receive chains 322a, 322b with a critical power level. If this component is subsequently down-converted due to an LO spur ($f_{SPUR1}$ in this example), the performance of the receiver may be degraded substantially.

The modulated spur interference and the IMD2 interference may be cancelled with all-digital cancellation technique. However, the main challenge of an all-digital cancellation technique is to estimate the TX-RX leakage channel including highly non-linear components such as a PA or frequency-selective components such as a duplexer. The high complexity of the all-digital cancellation technique driven by this estimation process limits the amount of cancellation and the convergence time of the filter.

Examples are disclosed for an apparatus (transceiver) and method for mitigating or cancelling interference or impairments in a received signal. The examples disclosed herein may use a mixed-signal interference cancellation (MSC) approach wherein an interference reference signal is generated in an analog domain and the interference is cancelled or mitigated in a digital domain based on the interference reference signal.

Examples are disclosed for an apparatus and method for mitigating interference caused by a modulated spur and an IMD2 due to the interfering signals at a known frequency. In the examples, a replica of the interference signal is generated in the analog domain and a digital cancellation system (DCS) uses the replica to perform cancellation or mitigation of interference caused by the modulated spur, IMD2, or any non-linear impairments.

In examples, the interference caused by modulated spurs, IMD2, CIMD3, or other interferences induced by non-linear characteristics of the receiver may be cancelled at least in part using an MSC approach. Instead of providing a dedicated analog auxiliary receiver/receive chain in a transceiver to sense the transmit leakage signal or other interfering signals and convert it to a digital domain to provide the digital cancellation system (DCS) with a reference signal for interference cancellation, in examples disclosed herein, hardware components existing in a transceiver (i.e. the receive chains already provided in the transceiver for communication, such as for carrier aggregation) are re-used for this purpose. Therefore, the examples disclosed herein may reduce the overall implementation costs of cancellation systems and increase the cancellation performance at the same time.

The interference reference signal generated in accordance with the examples disclosed herein contains frequency selective shaping of the TX-RX leakage channel, and therefore it reduces the complexity of the adaptive digital cancellation architecture. This results in a higher amount of cancellation with faster convergence times and reduces production costs by reusing existing hardware components.

The increasing number of bands, band combinations, and aggregation bandwidths drives the complexity of transceivers, and higher losses in transmit power of a complex RF front-end and also increases a transmit-to-receive cross-talk. To support all band combinations with high-performance requirements a multitude of receive chains and phase-locked loops are needed. Typically, in a transceiver, a small number of receive chains are used, and remaining receive chains are deactivated.

In examples, the existing receiver hardware (receive chain) in a transceiver provided for multi-carrier communication may be used for interference cancellation instead of providing an additional dedicated hardware (receive chain) for interference cancellation. The examples disclosed herein leverages existing receive chains for carrier aggregation in a receiver for the generation of reference signals of interfering signals. Typically, hardware resources (receive chains) in a transceiver are scaled according to maximum data rate use cases, which may not occur frequently and most of the time some hardware resources are idling. In examples, this (existing) idling hardware resources are used for interference cancellation/mitigation. The interference reference signals generated with the available resources are provided to a simplified digital cancellation circuit with a high amount of cancellation and fast convergence time, in comparison to all digital cancellation techniques.

Figure 4:
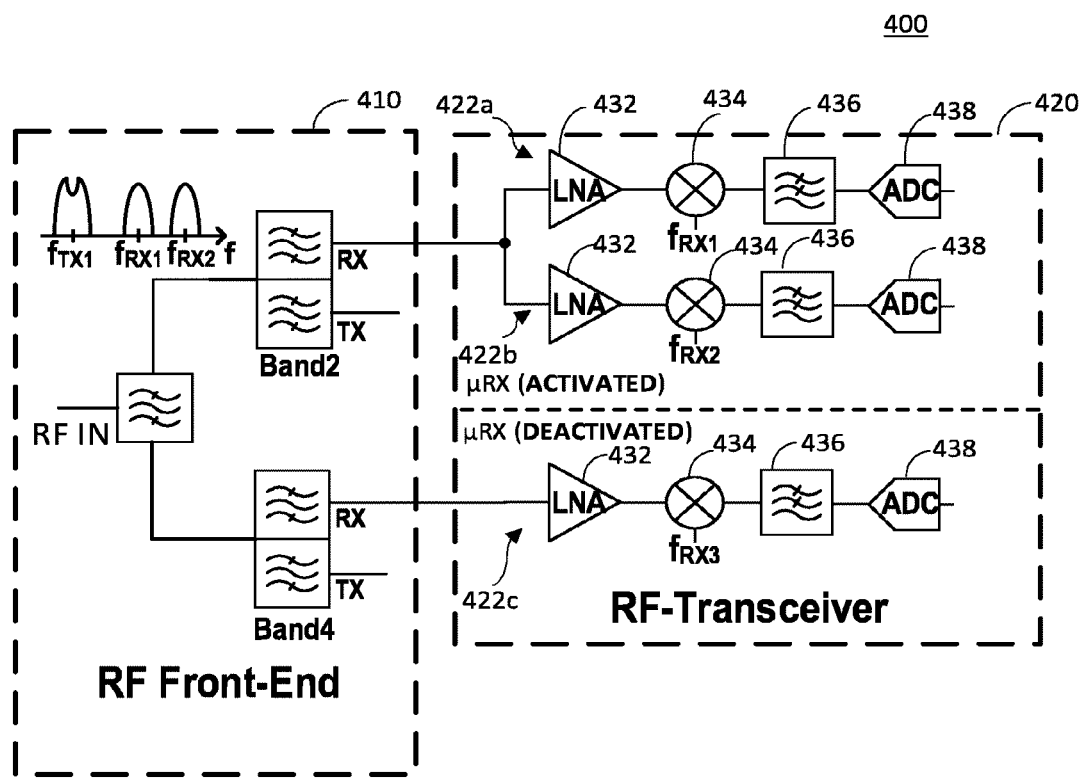
FIG. 4 shows a status of an example apparatus where a small number of receive chains are used and other receive chains are not used in a transceiver.

FIG. 4 shows a status of an example apparatus 400 where a small number of receive chains are used (e.g. activated) and others are not used (e.g. deactivated) in a transceiver. The apparatus 400 includes an RF front-end 410 and an RF transceiver 420. The RF transceiver 420 includes one or more receivers and one or more transmitters. Each receiver may include one or more receive chains 422a, 422b, 422c and each transmitter may include a plurality of transmit chains (not shown in detail). Each receive chain and transmit chain include components for processing a received signal and a transmit signal, respectively. For example, each receive chain 422a, 422b, 422c may include a low noise amplifier (LNA) 432 for amplifying a received signal, a mixer 434 for down-converting the received signal to baseband, a filter 436 for filtering the baseband received signal, and an analog-to-digital converter (ADC) 438 for converting the analog baseband signal to a digital domain. Each transmit chain may include a digital-to-analog converter (DAC) for converting a transmit signal to an analog signal, a filter for filtering the signal, a mixer for upconverting the transmit signal to an RF signal, and a power amplifier for amplifying the RF signal. FIG. 4 shows only schematic details of receive chains and does not show details of a transmit chain for simplicity. The example in FIG. 4 shows only three receive chains but the number of receive chains (and the number of transmit chains) may be any number (e.g. five or less, 10 or less, 14 or less, etc.).

One or more receive chains and one or more transmit chains may be activated and deactivated (e.g. under the control of the network). One or more receive chains and/or one or more transmit chains may be activated and used simultaneously, e.g. for carrier aggregation. In the example shown in FIG. 4, two receive chains 422a, 422b are activated for a two-carrier intra-band carrier aggregation mode (e.g. receiving via two component carriers in the same frequency band, e.g. Band 2) and the third receive chain 422c is deactivated. Typically, one or more receive chains are available independent of the receive scenario.

Figure 5:
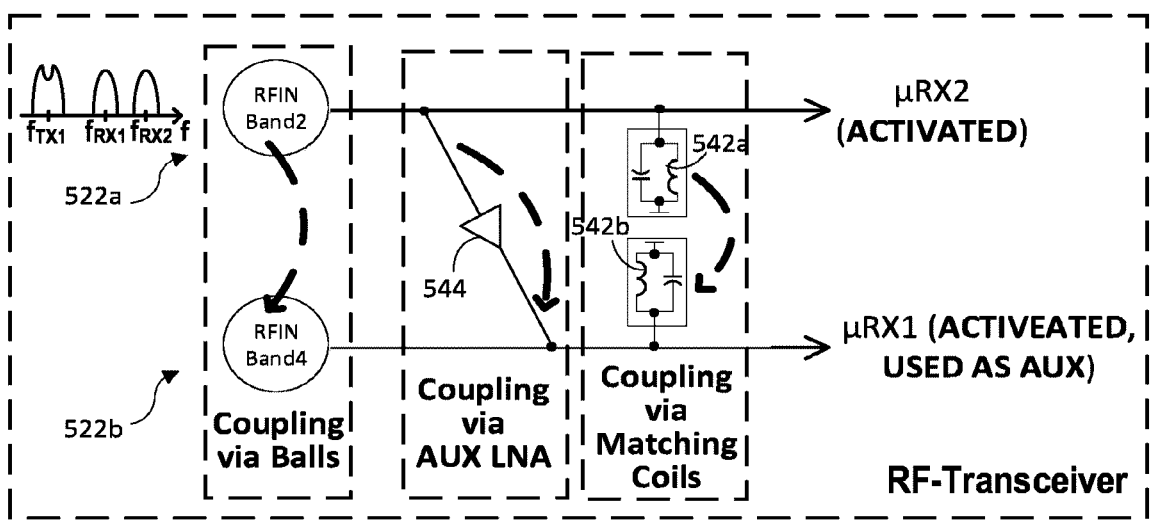
FIG. 5 shows three example types of coupling effects between receive chains, which may be exploited for receiving, detecting, or capturing the interfering signals.

In examples disclosed herein, the deactivated receive chain may be used to sense the interfering signals (e.g. the transmit leakage signals), and generate an interference reference signal. The un-used receive chain can be used for interference detection. The received signal on a target receive chain for interference cancellation/mitigation may be captured by a receive chain neighboring the target (victim) receive chain and the interference reference signal may be generated from the captured signal. The interfering signals may be received or captured by the un-used neighboring receive chain by exploiting coupling effects between receive chains. FIG. 5 shows three example types of coupling effects between receive chains, which may be exploited herein for receiving, detecting, or capturing the interfering signals.

For example, a received signal on one receive chain 522a may be coupled to another receive chain 522b due to a coupling effect via package balls or pins. An RF transceiver (a semiconductor chip) is installed on a printed circuit board via an integrated circuit (IC) package. The IC package may be installed onto a printed circuit board with solder balls or pins. A received signal (i.e. an RF signal) is sent from the RF front-end components to the RF transceiver via the solder balls or pins. There is a capacitive coupling effect between the solder balls or pins because of a finite isolation of the balls or pins of the IC package. Capacitive coupling is a transfer of energy in an electrical network by means of displacement current between circuit nodes induced by the electric field. This coupling may lead to coupling of the received signal on one receive chain to a neighboring receive chain.

There may also be coupling between matching coils 542a, 542b preceding the internal LNA in receive chains. A received signal is amplified by an LNA in a receive chain. A circuit including a matching coil 542a, 542b may be provided to each LNA in each receive chain for impedance matching, etc. The received signal on one receive chain may be coupled to another receive chain due to an electromagnetic coupling effect between the matching coils 542a, 542b preceding the LNAs in the receive chains. This coupling may lead to coupling of the received signal on one receive chain 522a to a neighboring receive chain 522b.

Alternatively, an auxiliary LNA 544 may be provided to couple two receive chains 522a, 522b. The auxiliary LNA 544 may be provided to couple two receive chains 522a, 522b before or after the LNAs in the receive chains. The auxiliary LNA may be a low performant LNA (e.g. a class AB inverter-based LNA).

Figure 6:
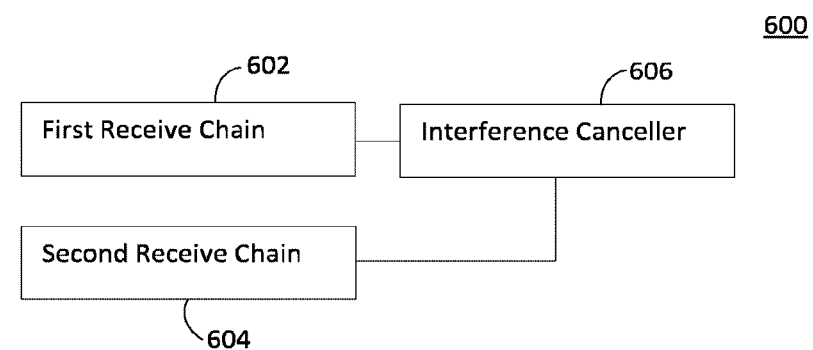
FIG. 6 is a block diagram of an apparatus configured to cancel or mitigate interference caused by a modulated spur and/or an IMD2 in accordance with one example.

FIG. 6 is a block diagram of an apparatus 600 configured to cancel or mitigate interference caused by a modulated spur and/or an IMD2 in accordance with one example. The apparatus 600 may include a plurality of receive chains, (e.g. a first receive chain 602 and a second receive chain 604), and an interference canceller 606. The apparatus 600 may include more than two receive chains for processing a received signal(s) and one or more transmit chains (not shown) for processing a transmit signal(s). The first receive chain 602 is configured to process a received signal. The first receive chain 602 may include a mixer configured to down-convert the received signal using a local oscillator signal having a first frequency. The received signal includes a wanted signal and an unwanted signal. The received signal on the first receive chain 602 may be captured, detected, or transferred onto the second receive chain 604 via a coupling effect or a coupling device (e.g. an LNA). The second receive chain 604 is configured to process the received signal and generate an interference reference signal from the received signal. The second receive chain 604 may include a mixer configured to down-convert the received signal using a local oscillator signal having a second frequency. The interference canceller 606 is configured to compensate, cancel, or mitigate, in a digital domain, at least in part, interference or impairments caused in the presence of the unwanted signal from the down-converted received signal by the first receive chain 602. The interference or impairments incurred to the received signal may be interference caused by a modulated spur, an IMD2, a transmit signal-induced CIMD3, etc.

In some example, the second receive chain may be one of a plurality of receive chains provided for receiving a signal for wireless communication. The second receive chain may not be the components dedicated for interference cancellation/mitigation purposes but provided for normal/regular wireless communication with a counterpart. For example, the second receive chain may be one of a plurality of receive chains provided in the apparatus for carrier aggregation.

In some examples, the received signal may be provided from the first receive chain to the second receive chain via a low noise amplifier coupling the first receive chain and the second receive chain. Alternatively, the received signal may be provided from the first receive chain to the second receive chain passively by electro-magnetic or capacitive coupling (i.e. the received signal may be captured from the first receive chain onto the second receive chain by electro-magnetic or capacitive coupling.

In some examples, the first local oscillator signal may include spurs caused by a third local oscillator signal used in a third receive chain (another receive chain in the apparatus), and the interference canceller may be configured to cancel, at least in part, interference caused by modulated spurs introduced by the spurs in the presence of the unwanted signal in the received signal. For example, the unwanted signal may be a transmit signal transmitted by the apparatus and leaked on the first receive path. The unwanted signal may be a third order counter intermodulation distortion generated from transmit signals at two or more carriers and leaked onto the first receive chain. The unwanted signal may be an adjacent channel leakage of a transmit signal transmitted by the apparatus. In some examples, the interference canceller may be configured to cancel, at least in part, interference caused by a second order intermodulation distortion.

In some examples, the apparatus may include a frequency synthesizer configured to generate the first local oscillator signal, and a digital-to-time converter configured to generate the second local oscillator signal by shifting a frequency of the first local oscillator signal.

The apparatus may include a coupler coupled both to the first receive chain and the second receive chain to supply the received signal to the first receive chain and the second receive chain. The apparatus may include a transmit chain configured to transmit a signal, and a loopback path. The loopback path is provided for coupling an output of the transmit chain to an input of the first receive chain (and/or to the second receive chain). The interference canceller may be configured to estimate the non-linear characteristics of the first receive chain based on a test signal that is trans-mitted by the transmit chain and received by the first receive chain via the loopback path. The loopback path may be coupled to an output of a power amplifier in the transmit chain via a switch and coupled to an input of a low noise amplifier in the first receive chain via the coupler.

Alternatively, the interference canceller may be configured to estimate the non-linear characteristics of the first receive chain based on the test signal transmitted by the transmit chain and received by the first receive chain and the second receive chain via the loopback path.

Figure 7:
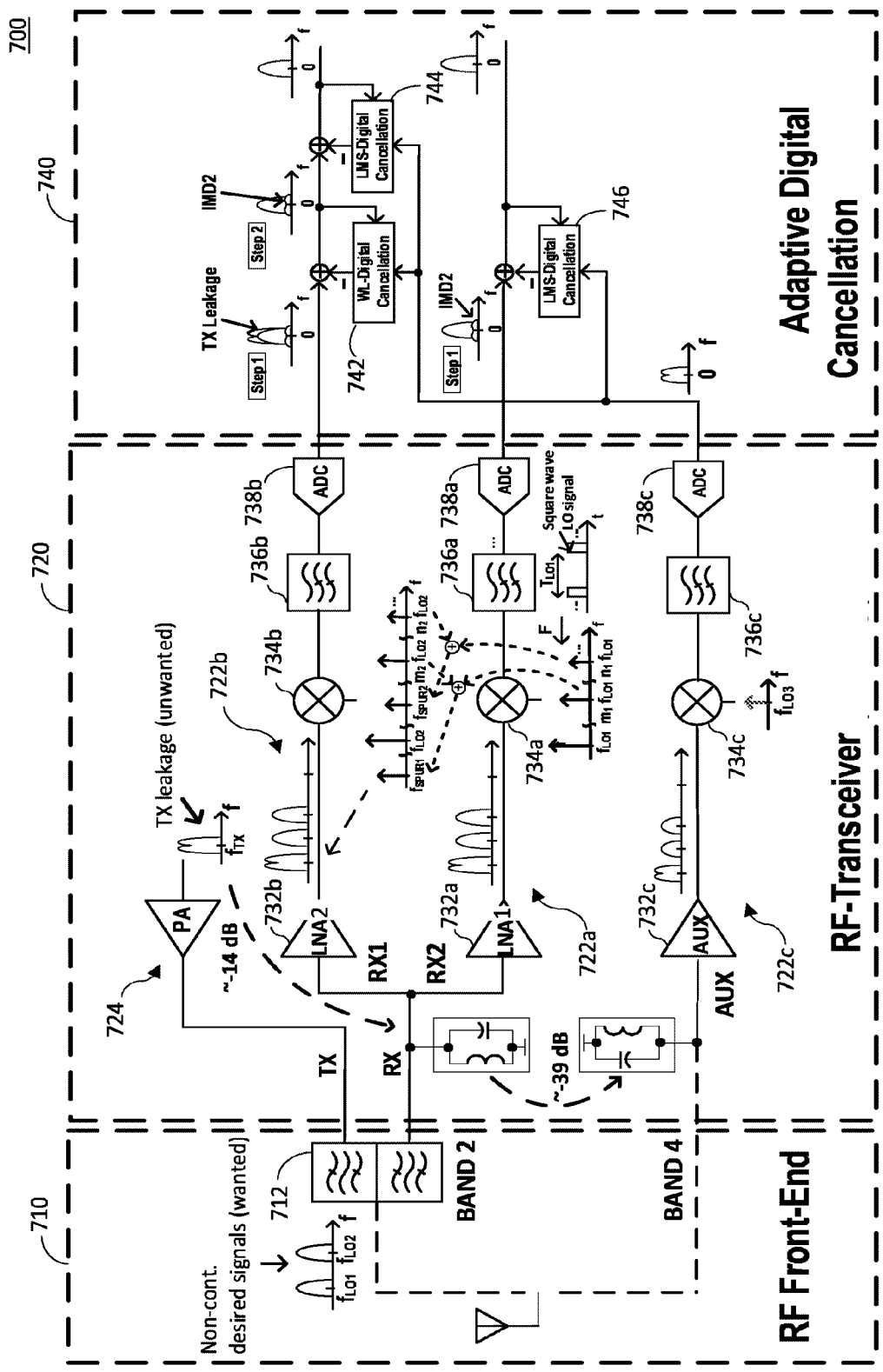
FIG. 7 shows an example apparatus configured to cancel or mitigate interference caused by a modulated spur and/or an IMD2 in accordance with one example.

FIG. 7 shows an example apparatus 700 configured to cancel or mitigate interference caused by a modulated spur and/or an IMD2 in accordance with one example. The apparatus 700 may include an RF front-end 710, an RF transceiver 720, and an interference canceller 740. The RF front-end 710 includes filters for filtering a received signal and/or a transmit signal, a duplexer 712 for transmitting and receiving signals via an antenna, etc. The RF transceiver 720 may include a plurality of receive chains 722a, 722b, 722c and one or more transmit chains 724. The receive chains (and the transmit chains) are provided for wireless communications, for example with a network or any other entity (e.g. for processing received signals from the network and processing transmit signals to the network). For example, two or more receive chains and/or two or more transmit chains in the apparatus 700 may be activated simultaneously for carrier aggregation such that the apparatus 700 may receive signals via two or more component carriers (in the same frequency band or different frequency bands) simultaneously using the activated receive chains, or transmit signals to the network via two or more component carriers (in the same frequency band or different frequency bands) simultaneously using the activated transmit chains. The receive chains are provided in the apparatus 700 for regular communication with a network (e.g. for carrier aggregation or simultaneous reception for Long Term Evolution (LTE), Fifth Generation (5G), WiFi, etc.) and are not a separate dedicated hardware for interference cancellation purposes.

In the example in FIG. 7, two receive chains 722a, 722b are activated for receiving signals via two component carriers (centered at $f_{LO1}$ and $f_{LO2}$) in Band 2, and a third receive chain 722c is not used for receiving signals (i.e. in a deactivated state). FIG. 7 shows only three receive chains for simplicity but the apparatus 700 may include more than three receive chains. FIG. 7 shows only one transmit chains for simplicity but the apparatus 700 may include more than one transmit chain.

The received signal passes through the duplexer 712 in the RF front-end 710 and sent to a first receive chain 722a and a second receive chain 722b. The received signal includes wanted signals, in this example, at two (e.g. non-contiguous) frequencies (e.g. a first component carrier at $f_{LO1}$ and a second component carrier at $f_{LO2}$). The received signal also includes unwanted signal(s). The transmit chain 724 is activated and transmits a signal. The transmit signal may be leaked into the receive chains 722a, 722b through the duplexer 712, and the leaked transmit signal becomes one of the strong interference signals.

The received signal is amplified by an LNA 732a and down-converted by a mixer 734a in the first receive chain 722a, e.g. using an LO signal with $f_{LO1}$, and then filtered by a filter 736a and converted to a digital domain by an ADC 738a. The received signal is also amplified by an LNA 732b and down-converted by a mixer 734b in the second receive chain 722b, e.g. using an LO signal with $f_{LO2}$, and then filtered by a filter 736b and converted to a digital domain by an ADC 738b.

As discussed above, device non-linearities on the LO signal distribution paths and/or cross-talk between the LO signal paths may lead to generation of LO spurs. The spur frequency due to the LO-LO cross-talk is a harmonic combination of the LO signals. For example, in FIG. 7, the first LO signal being used in the first receive chain 722a may be coupled to the second LO signal being used in the second receive chain 722b, and an LO spur (e.g. at $f_{SPUR1}$) may be incurred in the second LO signal by the harmonic combination of the first LO signal and the second LO signal (e.g. by a combination of $m_1 f_{LO1}$ and $m_2 f_{LO2}$). The LO spur may down-convert the unwanted signal (e.g. the leaked transmit signal) to baseband, which may overlap the wanted signal in baseband. The non-linearity of a device such as the mixer 734a in the presence of the unwanted signal may generate an IMD2, which impairs demodulation of the wanted signal. The IMD2 may be incurred both in the first receive chain 722a and in the second receive chain 722b.

In examples, a third receive chain 722c (not a receive chain dedicated for interference cancellation, but one of the receive chains provided in the apparatus 700 for communication) may be activated and used for generating an interference reference signal from the received signal. The received signal on the first and second receive chains 722a, 722b may be captured onto the third receive chain 722c by the coupling effect as discussed with reference to FIG. 5. FIG. 7 shows coupling via the matching coils for LNAs but the coupling may be via package balls/pins or via an auxiliary LNA coupling the first or second receive chain 722a/722b to the third receive chain 722c. The third receive chain 722c may be a neighboring receive chain near or next to the first or second receive chain 722a/722b.

The received signal captured or transferred onto the third receive chain 722c is amplified by an LNA 732c and down-converted by a mixer 734c in the third receive chain 722c and then filtered by a filter 736c and converted to a digital domain by an ADC 738c. The LO signal for the mixer 734c is tuned to the unwanted signal, (in this example, the frequency of the leaked transmit signal, i.e. $f_{LO3}=f_{TX}$) so that the unwanted signal is down-converted to baseband.

The interference canceller 740 cancels or mitigates the interference caused by the modulated spur and/or IMD2 in a digital domain. The output from the ADC 738c in the third receive chain 722c is used as a reference signal for interference cancellation in the interference canceller 740. The interference cancellation signal is generated by digital filters 742, 744 for cancellation of a modulated spur interference and an IMD2 interference from the output of the ADC 738b in the second receive chain 722a, respectively, and the interference cancellation signal is generated by a digital filter 746 for cancellation of IMD2 interference from the output of the ADC 738a in the first receive chain 722a.

Figure 8:
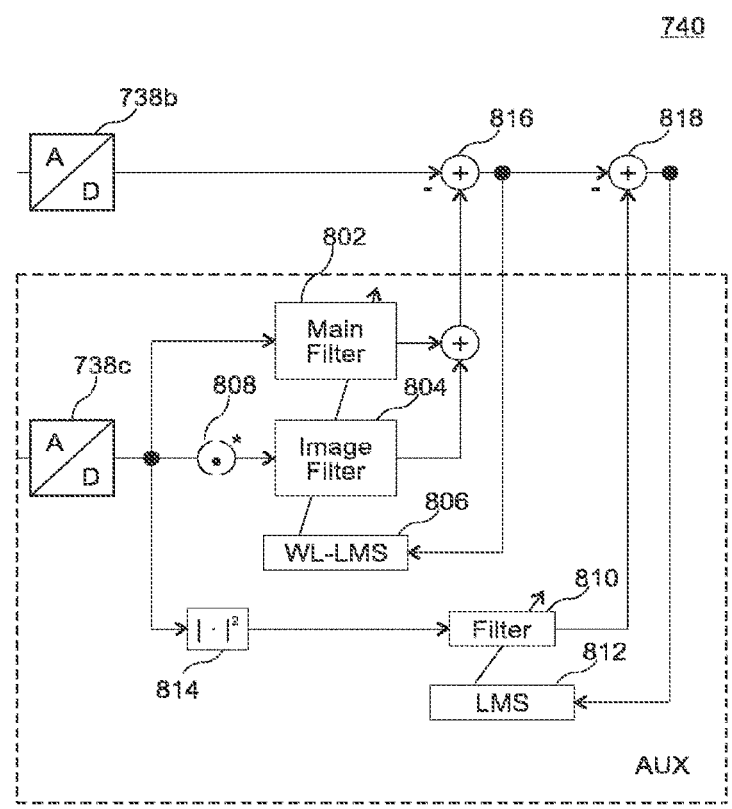
FIG. 8 shows an example structure of an interference canceller for cancellation of the modulated spur interference and its image and the IMD2 interference in digital domain.

FIG. 8 shows an example structure of an interference canceller 740 for cancellation of the modulated spur interference and its image and the IMD2 interference in digital domain. Example processing for the interference cancellation will be explained with reference to FIG. 8 below.

The total received signal ($y_{tot}[n]$) in baseband (e.g. the output of the ADC 738b) in the presence of the modulated spur and the IMD2 interference can be written as follows:

$$y_{tot}[n]=x_{wan}[n]+x_{noise}[n]+x_{mod\_spur}[n]+x_{mod\_spur\_img}[n]+x_{imd2}[n], \quad \text{Equation (1)}$$

where $x_{wan}[n]$ and $x_{noise}[n]$ represent the wanted signal and noise in the receiver, respectively, $x_{mod\_spur}[n]$ and $x_{mod\_spur\_img}[n]$ denote the modulated spur and its image interference, respectively, and $x_{imd2}[n]$ represents the IMD2 interference in the receiver. The relation of each interference with respect to the transmit baseband signal $x_{tx}[n]$ is as follows:

$$x_{mod\_spur}[n] = g_{sp} h_{txl}[n] x_{tx}[n] e^{\frac{j2\pi f_\Delta n}{fs}}, \quad \text{Equation (2)}$$

$$x_{mod\_spur\_img}[n] = g_{sp\_img} h_{txl}^*[n] x_{tx}^*[n] e^{\frac{-j2\pi f_\Delta n}{fs}}, \quad \text{Equation (3)}$$

$$x_{imd2}[n] = g_{imd2} |h_{txl}[n] x_{tx}[n]|^2, \quad \text{Equation (4)}$$

where $h_{txl}[n]$ denotes the transmit leakage channel from the transmitter to the receiver, $[.]^*$ denotes a complex conjugate, $g_{sp}$, $g_{sp\_img}$, and $g_{imd2}$ are gain factors for the modulated spur and its image and IMD2. The baseband spur frequency offset $f_\Delta$ is given by the difference between the transmit frequency and the spur frequency.

The signal at the receiver LNA input (e.g. the input to the LNA 732b) can be written as:

$$y_{lna\_in}(t)=x_{wan}(t)+x_{noise}(t)+x_{txl}(t), \quad \text{Equation (5)}$$

where $x_{txl}(t)$ denotes the leaked transmit signal at the receiver LNA input and the signal in time-discrete form is given by:

$$x_{txl}[n]=h_{txl}[n] x_{tx}[n] \quad \text{Equation (6)}$$

The relation between each interference and the leaked Tx signal may be written as follows:

$$x_{mod\_spur}[n] = g_{sp} x_{txl}[n] e^{\frac{j2\pi f_\Delta n}{fs}}, \quad \text{Equation (7)}$$

$$x_{mod\_spur\_img}[n] = g_{sp\_img} x_{txl}^*[n] e^{\frac{-j2\pi f_\Delta n}{fs}}, \quad \text{Equation (8)}$$

$$x_{imd2}[n] = g_{imd2} |x_{txl}[n]|^2. \quad \text{Equation (9)}$$

The signal at the receiver LNA input couples to the auxiliary receiver (e.g. the third receive chain 722c in FIG. 7). The auxiliary receiver is an existing un-used receiver (receive chain) that is located close to the main receiver (e.g. the first or second receive chain 722a, 722b in FIG. 7). The signal at the LNA output in the auxiliary receiver may be written as follows:

$$y_{aux\_lna\_out}(t)=g_{aux\_lna}(y_{lna\_in}(t)), \quad \text{Equation (10)}$$

where $g_{aux\_lna}$ represents the auxiliary LNA gain. The auxiliary receiver is tuned to the transmit frequency in order to receive only the leaked transmit signal in the receiver. After low-pass filtering and converting to the digital domain, the signal at the output of the ADC (e.g. the DAC 738c) of the auxiliary receiver is given by:

$$y_{aux\_adc\_out}[n]=g_{aux\_lna} x_{txl}[n]+x_{aux\_noise}[n], \quad \text{Equation (11)}$$

where $g_{aux\_lna}$ denotes the auxiliary LNA gain and $x_{aux\_noise}[n]$ represents the remaining noise. Since the auxiliary receiver is an existing high-performance receiver, an SNR of 35 dB may be easily achievable. Therefore, the noise in the auxiliary receive chain may be ignored in further analysis. The signal from the auxiliary receiver acts as the reference signal for the interference cancellation.

For cancelation of the modulated spur interference, the auxiliary signal (i.e. the reference signal, e.g. the output from the ADC 738c) is processed by a filter 802 with filter coefficients determined by an adaptation block 806 (e.g. a least mean square (LMS) adaptive algorithm) and then subtracted by an adder 816 from the received signal. For cancelation of the modulated spur image interference, the auxiliary signal is processed by a filter 804 with filter coefficients determined by the adaptation block 806 and then subtracted by the adder 816 from the received signal.

For cancelation of the modulated spur interference, the auxiliary signal (i.e. the reference signal, for example the output from the ADC 738c) is frequency-shifted by a value $f_\alpha$. The frequency-shifted output is given by:

$$y_{aux\_freq\_sft}[n] = g_{aux\_lna}x_{txl}[n]e^{\frac{j2\pi f_\Delta n}{fs}}. \quad \text{Equation (12)}$$

The relation between this frequency-shifted auxiliary signal and the modulated spur interference can be written as:

$$x_{mod\ spur}[n] = \frac{g_{sp}}{g_{aux\_lna}} y_{aux\ freq\ sft}[n]. \quad \text{Equation (13)}$$

The modulated spur and the frequency-shifted auxiliary signal are linearly dependent. For example, the coefficients for the filter 802 may be estimated by an LMS adaptation block 806 using an LMS algorithm. The LMS adaptation block 806 may estimate the modulated spur interference by minimizing the instantaneous squared error between the estimated and the actual interference. The update equation implemented by the LMS adaptation block 806 may be given by:

$$w[n+1]=w[n]+\mu e^*[n]y_{aux\ freq\ sft}[n], \quad \text{Equation (14)}$$

where w is the adaptive filter coefficients.

For modulated spur image cancellation, the auxiliary signal is conjugated (by the block 808) and then frequency-shifted by a value $-f_\Delta$. The frequency-shifted output signal can be written as:

$$y_{aux\_freq\_sft\_neg}[n] = g_{aux\_lna}x^*_{txl}[n]e^{\frac{-j2\pi f_\Delta n}{fs}}. \quad \text{Equation (15)}$$

This signal is linearly dependent to the modulated spur image. The modulated spur image is estimated by feeding the frequency-shifted signal to an adaptive filter 804.

In examples, both the modulated spur and image may be cancelled in parallel, using two adaptive filters 802, 804 with the LMS adaptation block 806. The two input signals to the filters 802, 804 are conjugate to one-another. This forms a widely-linear (WL) adaptive filter structure for mitigating both the spur and image simultaneously.

In case of the IMD2 interference, the envelope of the auxiliary signal is extracted by computing abs(.)² (by the block 814). This can be written as:

$$y_{aux\_imd2}[n]=g_{aux\_lna}{}^2|x_{txl}[n]|^2. \quad \text{Equation (16)}$$

The resulting signal is a linear function of the IMD2 interference which can then be estimated using an LMS adaptive filter (the blocks 810, 812).

FIGS. 7 and 8 show interference cancellation based on LMS algorithm but other adaptive or non-adaptive (e.g. least-square algorithm) cancellation algorithm may also be used.

FIGS. 9A-9D and FIG. 10 show simulation results for cancellation of modulated spur interference and IMD2 interference in accordance with the example. For the measurements, the receiver in FIG. 7 is configured for LTE band 2 and an RF bandwidth of 10 MHz per carrier for a two-CA case with LO1 (primary component carrier) and LO2 (secondary component carrier) set to 1,953.5 MHz and 1,983.5 MHz, respectively. The neighboring receive path, which acts as the auxiliary path, is configured for an RF bandwidth of 10 MHz and tuned to the frequency of the interfering signal ($f_{LO3}=f_{TX}=1,923.5$ MHz). The auxiliary path receives the interfering signal via the coupling of the matching coils and provides a reference for the adaptive digital cancellation. Using this approach, the modulated spur and IMD2 interference can be canceled.

Figure 9:
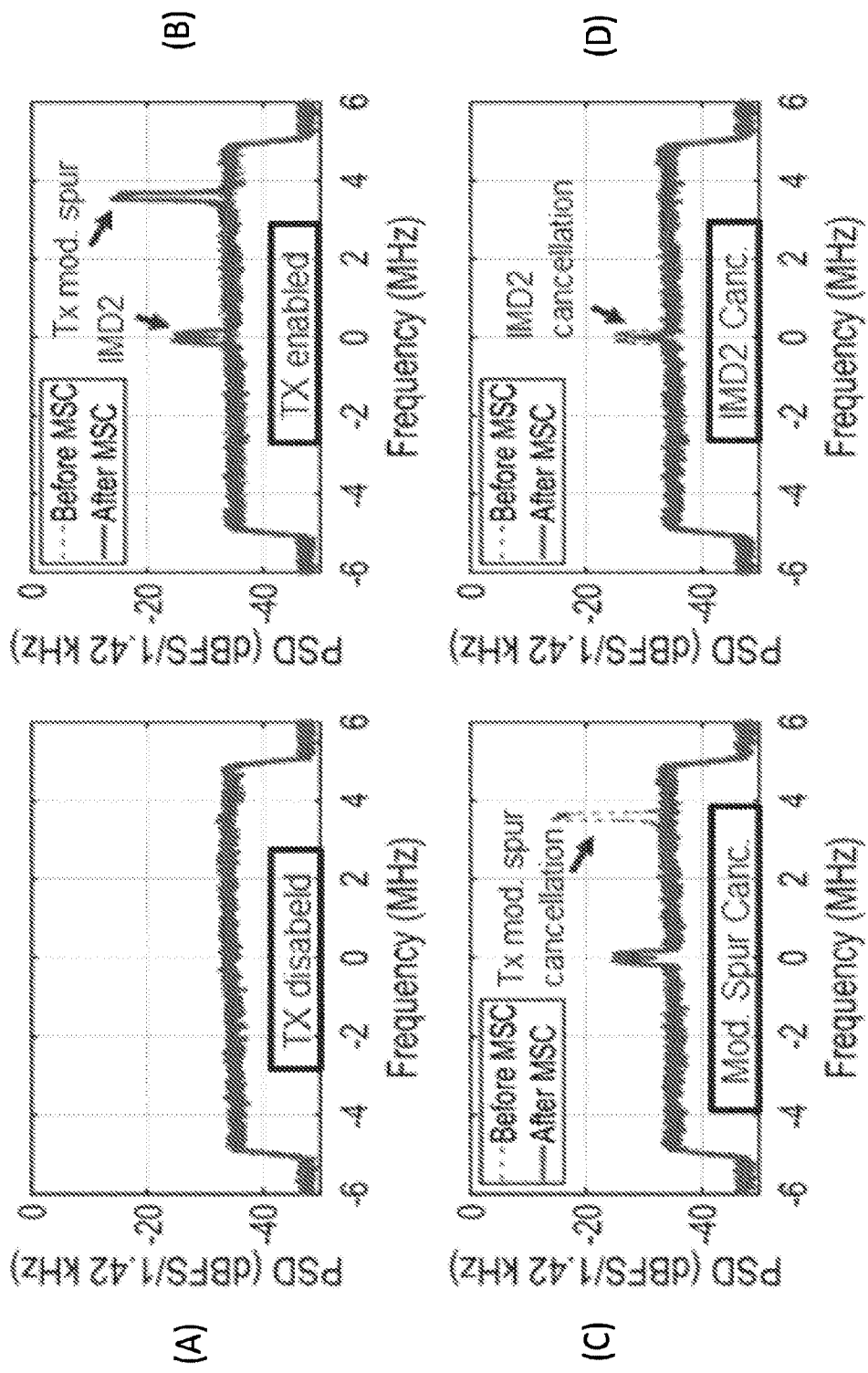
FIGS. 9A-9D show simulation results for cancellation of modulated spur interference and IMD2 interference in accordance with the example.

FIG. 9A shows the power spectral density for the received signal with transmitter disabled. FIG. 9B shows that with the transmitter enabled the transmit leakage is present with −17 dBm at the LNA input of the main receive chain and induces modulated spur and IMD2 interference in the baseband. FIGS. 9C and 9D show modulated spur cancellation and IMD2 cancellation, respectively. With the example scheme disclosed above, the interference can be cancelled 6 dB below the noise floor and the performance of the receiver can be restored.

Figure 10:
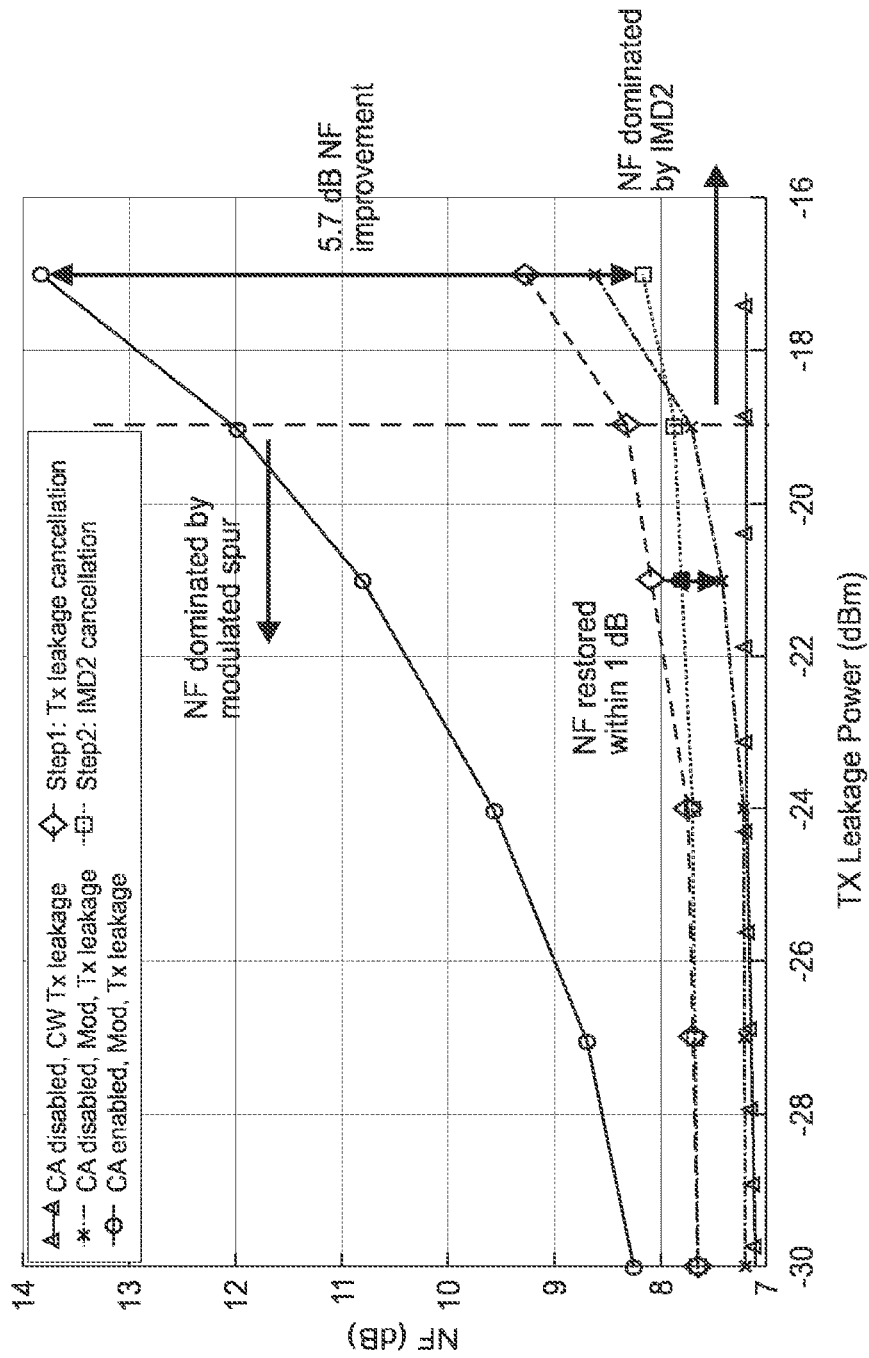
FIG. 10 shows simulation results for cancellation of modulated spur interference and IMD2 interference in accordance with the example.

FIG. 10 shows the cancellation performance dependent on the TX leakage power level at the input of the LNA of the main receive chain. Along with the modulated spur the IMD2 component can be canceled and the effective noise figure can be restored to a value below 1 dB of the reference value. As shown in FIG. 10, for higher TX leakage power levels (>−19 dBm) the IMD2 interference is dominating the noise figure (NF) and for lower TX leakage power levels (<−19 dBm) the modulated spur interference is dominating the NF. Due to the IMD2 cancellation, the NF can even be improved to a value (after step 2: IMD2 cancellation) below the reference value (the plot for CA disabled, modulated TX enabled).

Figure 11:
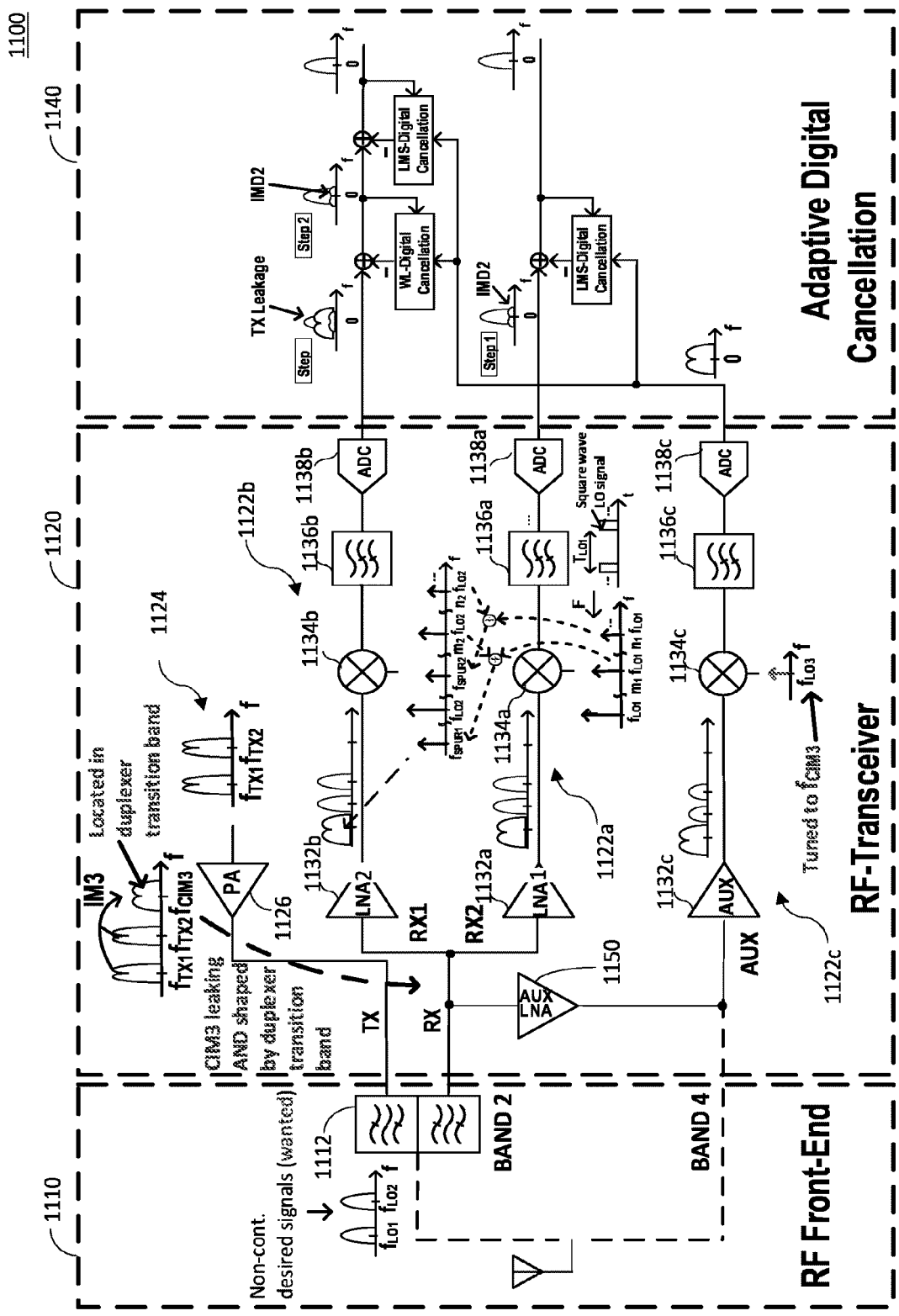

FIG. 11 shows an example structure of an apparatus 1100 configured to cancel or mitigate interference caused by the transmitter-induced CIMD3 product and/or the IMD2 in accordance with one example. FIG. 11 shows cancellation of a dual uplink transmitter-induced CIMD3 component. The apparatus 1100 may include an RF front-end 1110, an RF transceiver 1120, and an interference canceller 1140. The RF front-end 1110 includes filters, a duplexer 1112 for transmitting and receiving signals via an antenna, etc. The RF transceiver 1120 may include a plurality of receive chains and one or more transmit chains. The receive chains (and the transmit chains) are provided for wireless communications, for example with a network or any other entity (i.e. processing receive and transmit signals). For example, two or more receive chains and/or two or more transmit chains in the apparatus 1100 may be activated simultaneously for carrier aggregation such that the apparatus 1100 may receive signals via two or more component carriers (in the same frequency band or different frequency bands) simultaneously using the activated receive chains, or transmit signals via two or more component carriers (in the same frequency band or different frequency bands) simultaneously using the activated transmit chains.

In FIG. 11, two receive chains 1122a, 1122b are activated for receiving signals via two component carriers (at $f_{LO1}$ and $f_{LO2}$) in Band 2, and a third receive chain 1122c is not used for receiving signals (i.e. in a deactivated state). The apparatus 1100 may include more than three receive chains but FIG. 11 shows only three receive chains for simplicity. The received signal passes through a filter in the RF front-end 1100 and sent to a first receive chain 1122a and a second receive chain 1122b. The received signal includes wanted signals, in this example, at two (e.g. non-contiguous) frequencies (e.g a first component carrier at $f_{LO1}$ and a second component carrier at $f_{LO2}$).

Transmit chains 1124 (details not shown) in the apparatus 1100 are also activated for transmitting signals, in this example via two component carriers at $f_{TX1}$ and $f_{TX2}$. Intermodulation distortion products may be generated in the transmit chain. The two carriers (at $f_{TX1}$ and $f_{TX2}$) in the transmit chains 1124 pass through a non-linear power amplifier 1126 and a CIMD3 products (at $f_{CIM3}$) may be generated. This CIMD3 product may fall in or near a frequency of the transition band of the duplexer 1112 and may be present at the input of the receive chains 1122a, 1122b (e.g. LNAs). FIG. 11 shows the CIMD3 product shaped by the duplexer transition band at the input of the receive chains 1122a, 1122b.

The received signal is amplified by an LNA 1132a and down-converted by a mixer 1134a in the first receive chain 1122a, e.g. using an LO signal with $f_{LO1}$, and then filtered by a filter 1136a and converted to a digital domain by an ADC 1138a. The received signal is also amplified by an LNA 1132b and down-converted by a mixer 1134b in the second receive chain 1122b, e.g. using an LO signal with $f_{LO2}$, and then filtered by a filter 1136b and converted to a digital domain by an ADC 1138b.

As discussed above, device non-linearities on the LO signal distribution paths and/or cross-talk between the LO signal paths may lead to generation of LO spurs. The spur frequency due to the LO-LO cross-talk is a harmonic combination of the LO signals. For example, in FIG. 11, the first LO signal being used in the first receive chain 1122a may be coupled to the second LO signal being used in the second receive chain 1122b, and an LO spur (e.g. at $f_{SPUR1}$) may be incurred in the second LO signal by the harmonic combination of the first LO signal and the second LO signal (e.g. by a combination of $m_1 f_{LO1}$ and $m_2 f_{LO2}$). The LO spur may down-convert the unwanted signal (the CIM3 in this example) to baseband, that may overlap with the wanted signal. The device non-linearity such as the mixer 1134a, 1134b in the presence of the unwanted signal may generate IMD2, which also impairs demodulation of the wanted signal. The IMD2 may be incurred in the first and/or second receive chains 1122a, 1122b.

The third receive chain 1122c (not a receive chain dedicated for the purpose of interference cancellation, but one of the receive chains provided in the apparatus 1100 for communication, e.g. carrier aggregation) may be used for generating an interference reference signal from the received signal. The received signal on the first and second receive chains 1122a, 1122b may be captured or sent onto the third receive chain 1122c by the coupling effects as discussed above with reference to FIG. 5. FIG. 11 shows, as an example, coupling via an auxiliary LNA 1150 coupling the first and second receive chains 1122a, 1122b to the third receive chain 1122c. Alternatively, the coupling may be through the matching coils for LNAs or via package balls or pins. The third receive chain 1122c may be a neighboring receive chain near or next to the first or second receive chain 1122a, 1122b.

The received signal captured or transferred onto the third receive chain 1122c is amplified by an LNA 1132c and down-converted by a mixer 1134c in the third receive chain 1122c and then filtered by a filter 1136c and converted to a digital domain by an ADC 1138c. The LO signal for the mixer 1134c in the third receive chain 1122c is tuned to the frequency of the CIM3, (i.e. $f_{LO3}=f_{CIM3}$) so that the CIM3 product is down-converted to baseband.

The interference canceller 1140 cancels or mitigates the interference caused by the CIMD3 and/or IMD2 in a digital domain as disclosed above with reference to FIG. 8. The output from the ADC 1138c in the third receive chain 1122c is used as a reference signal for interference cancellation in the interference canceller 1140.

Figure 12:
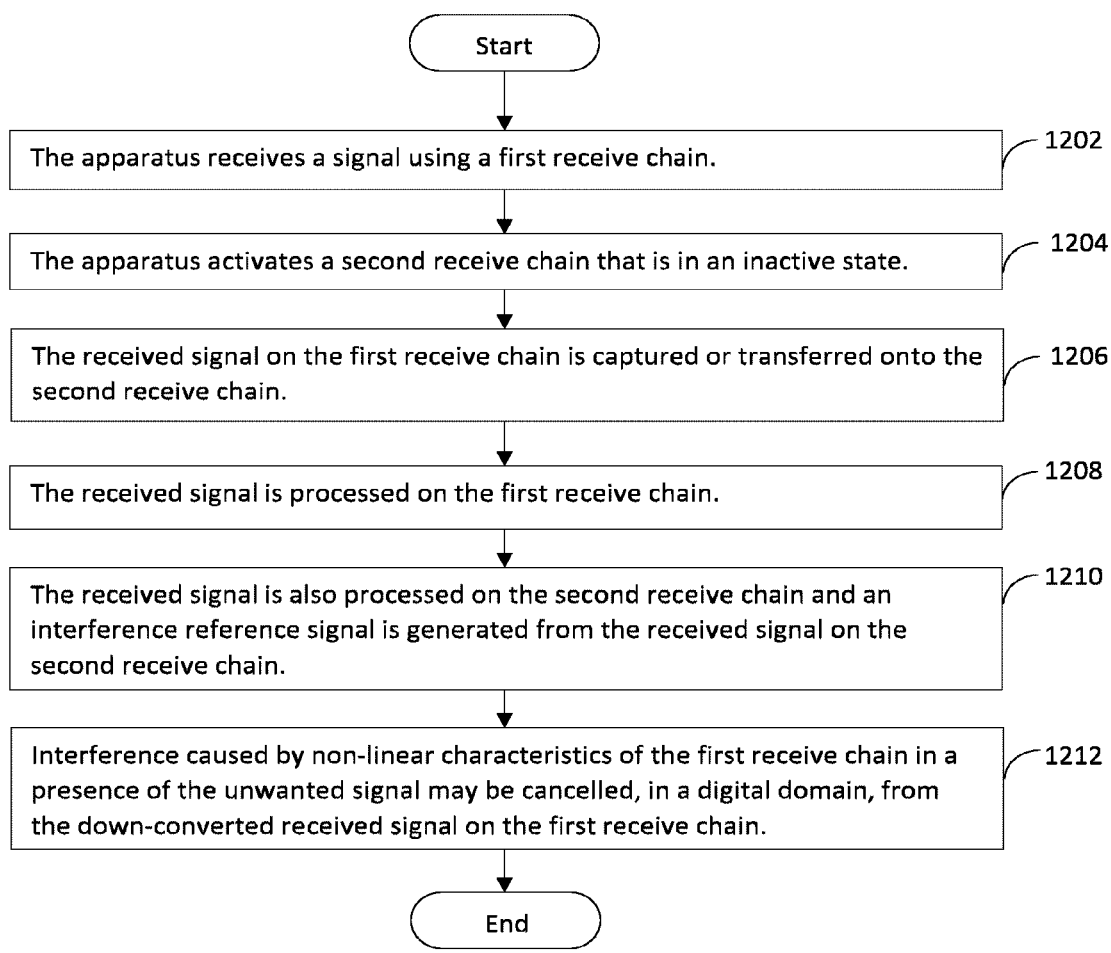
FIG. 12 is a flow diagram of an example process for cancelling interference from a received signal.

FIG. 12 is a flow diagram of an example process implemented in an apparatus (e.g. a transceiver) for cancelling interference from a received signal. The apparatus receives a signal using a first receive chain (1202). The apparatus activates a second receive chain that is in an inactive state (1204). The received signal on the first receive chain is captured or transferred onto the second receive chain (1206). The received signal is processed on the first receive chain (1208). The first receive chain includes a first mixer configured to down-convert the received signal using a first local oscillator signal having a first frequency and the received signal includes a wanted signal and an unwanted signal. The received signal is also processed on the second receive chain and an interference reference signal is generated from the received signal on the second receive chain (1210). The second receive chain includes a second mixer configured to down-convert the received signal using a second local oscillator signal having a second frequency. Interference caused by non-linear characteristics of the first receive chain in a presence of the unwanted signal may be cancelled at least in part, in a digital domain, from the down-converted received signal by the first receive chain (1212).

A receiver performance may be degraded due to an interference. It is very common in transceivers in systems such as 5G, 5G mmWave, LTE, WiFi, Bluetooth, or the like. The interference-caused performance degradation is an issue in many cases. For example, in a receiver, a strong blocker signal may be present at the antenna input outside the bandwidth of the desired signal. The blocker signal may cause a substantial interference to the desired signal. In case of loopback (LPBK)-aided calibration with frequency offset, the fundamental signal is considered as a blocker signal and the distortion (located outside the bandwidth of the fundamental signal) to be calibrated (e.g. out-of-band emissions (OOBE)) is the desired signal for calibration purposes. In other case, when two signals are transmitted simultaneously over two channels within the same frequency band (simultaneous multi-channel), those two signals, at a receiver side, can be viewed as a desired signal and a blocker signal.

In all cases above the interference can introduce various impairments, such as generation of non-linear products, reciprocal mixing, analog-to-digital converter (ADC) clipping, etc. These impairments can severely degrade the received signal quality.

The non-linear products, e.g. IMD2, CIMD3, etc., caused by non-linear characteristics of components (e.g. a mixer, etc.) in the receiver may degrade the SNDR of the wanted signal. Reciprocal mixing is a form of noise that is generated in a receiver due to a phase noise in the local oscillator signal. Reciprocal mixing occurs due to the fact that signals, including the local oscillator signals within the receiver have a certain amount of phase noise. When the phase noise of the local oscillator signal is mixed with a strong interfering signal this can mask out a wanted signal with a lower power level. ADC clipping is a form of distortion of ADC outputs. An ADC is a device that takes an analog input signal, samples it at discrete time intervals, and quantizes the signal amplitudes to discrete values. If the analog input signal exceeds the dynamic range of the ADC, the ADC clipping may occur. Storing blocker or interfering signals may cause the ADC clipping.

Conventional approaches to solve the above problems may need rigorous and challenging RF and baseband design, which may provide certain interference immunity with the assistance of filters (e.g. surface acoustic wave (SAW) filter, tunable RF filter, baseband filter, etc.) where applicable. However, RF simulations do not predict the circuit behavior very well in the associated aspects (e.g. due to RX non-linearity), which leads to longer time-to-market (TTM) periods (e.g. additional tape-outs, longer integration, etc.). In addition, the achievable performance is limited as the RX non-linearity would introduce interference-related undesired artifacts and degrade RX/LPBK performance. Conventional approaches also complicate the RF design, increase power consumption and Si/PCB area and may require higher resources and design and verification time.

Figure 13:
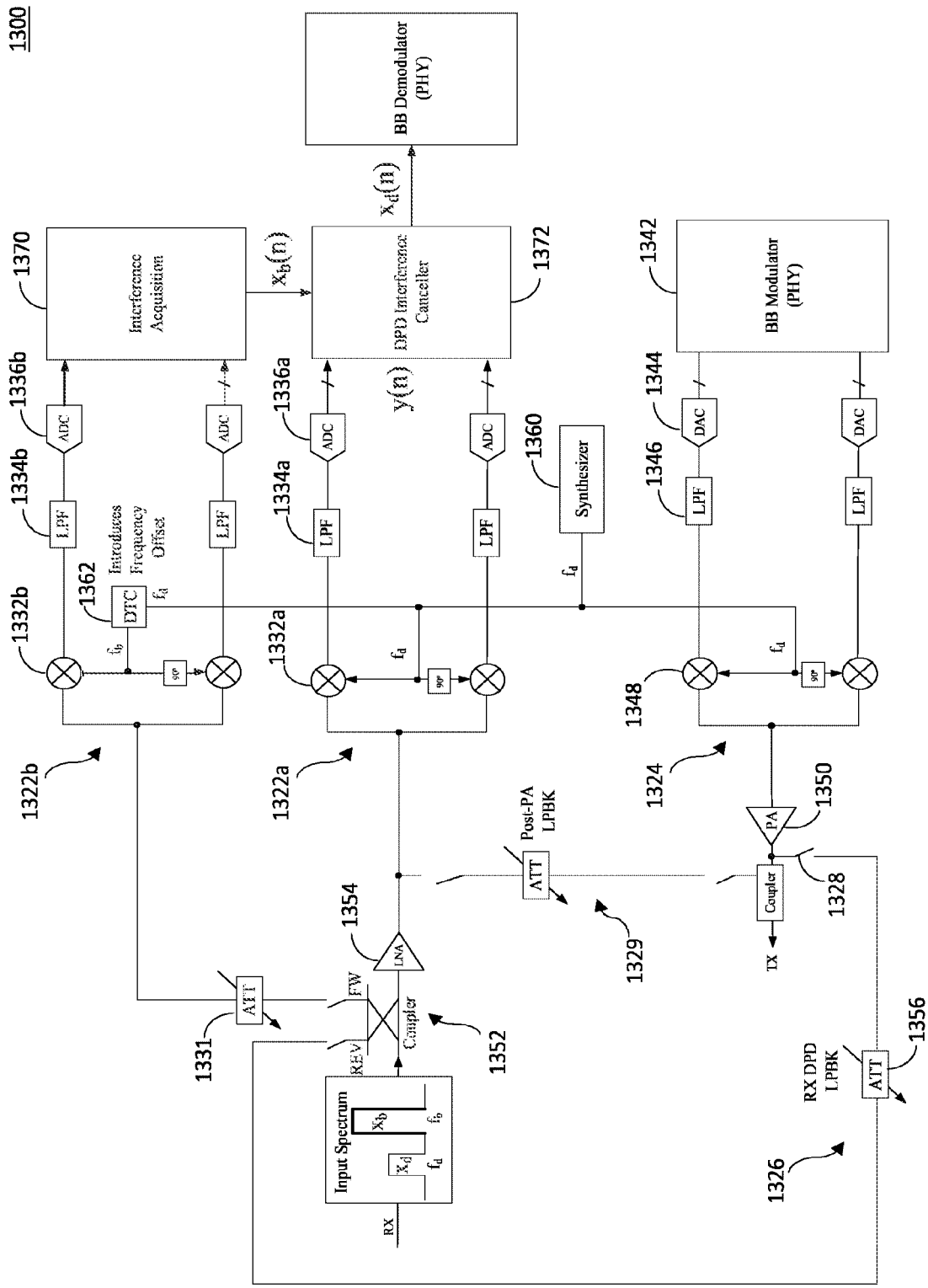
FIG. 13 shows an example apparatus configured to cancel or mitigate interference or non-linear impairments in a receiver in accordance with another example.

FIG. 13 shows an example apparatus 1300 configured to cancel or mitigate interference or non-linear impairments in a receiver in accordance with another example. The apparatus 1300 may include a plurality of receive chains 1322a, 1322b and at least one transmit chain 1324. Each receive and transmit chain 1322a, 1322b, 1324 may include in-phase/quadrature (I/Q) branches. In FIG. 13, a receive chain 1322a is a main receiver used for receiving signals, and a receive chain 1322b is an auxiliary receive chain used for interference cancellation. The auxiliary receive chain 1322b may be a receive chain dedicated for interference cancellation purposes or a receive chain provided for multicarrier communication (e.g. carrier aggregation) and not being used at the moment (e.g. in a deactivated state). FIG. 13 shows only two receive chains 1322a, 1322b for simplicity but the apparatus 1300 may include more than two receive chains. The received signal is sent to the receive chain 1322a via a coupler 1352. The received signal includes a wanted signal (centered at $f_d$) and an interference signal (e.g. a blocker signal centered at $f_b$). The received signal is amplified by an LNA 1354 and down-converted by a mixer 1132a, filtered by a filter 1334a, and then converted to a digital domain by an ADC 1136a.

The received signal is also sent to the auxiliary receive chain 1322b via the coupler 1352. The auxiliary receive chain 1322b may be coupled to the forward port (FW) of the coupler 1352 such that the received signal may be sent both to the receive path 1322a and the auxiliary receive path 1322b. The received signal may be attenuated by an attenuator 1331, down-converted by a mixer 1332b, filtered by a filter 1334b, and then converted to a digital domain by an ADC 1336b.

The transmit chain 1324 in the apparatus 1300 is also activated for transmitting signals. A transmit signal from a baseband modulator 1342 is converted to an analog domain by a digital-to-analog converter (DAC) 1344, filtered by a filter 1346, up-converted by a mixer 1348 using an LO signal, and then amplified by a PA 1350.

A synthesizer 1360 may generate LO signals for the mixers 1332a, 1332b in the receive chains 1322a, 1322b and the mixer 1348 in the transmit chain 1324. The same LO signal generated by the synthesizer 1360 may be sent to the receive chains 1322a, 1322b. The mixer 1332b in the auxiliary receive chain 1322b (e.g. dedicated or existing) down-converts the interfering signal (e.g. the blocker signal for RX use case) to baseband frequency. This will provide an excellent estimate of the interference. For the down-conversion of the interfering signal in the auxiliary receive chain 1322b, in one example, the auxiliary receive chain 1322b may use a frequency offset LO (e.g. implemented by a digital-to-time converter (DTC) 1362). The LO signal generated by the synthesizer 1360 may be frequency-shifted to the target frequency (e.g. the frequency of the interference signal) by the DTC 1362.

A DTC is a device that can control time delay of an input signal in accordance with a digital code. The DTC 1362 receives the LO signal from the synthesizer 1360 and may shift the frequency of the LO signal (from $f_d$ to $f_b$) by imposing specific delays to the input signal. Alternatively, a separate frequency synthesizer (e.g. a digital phase locked loop (DPLL)) may be used in the auxiliary receive chain 1322b instead of the DTC 1362.

The interference acquisition block 1370 generates an interference reference signal from the down-converted received signal in the auxiliary receive chain 1322b, and the digital post-distortion (DPD) interference canceller 1372 may cancel the interference caused by the non-linearities of the receive chain based on the interference reference signal.

For the interference cancellation, the receiver's non-linearity may be estimated. In order to estimate the receiver's non-linearity, a low-power (linear) test signal may be sent from the transmit chain 1324 to the receive chain 1322a via a DPD loopback path 1326. The DPD loopback path 1326 is coupled to an output of the PA 1350 in the transmit chain 324 via a switch 1328 at one end and coupled to an input of the LNA 1354 in the receive chain 1322a via a reverse port (REV) of the coupler 1352 at the other end. This DPD loopback path 1326 is different from a regular post-PA loopback 1329, as the DPD loopback path 1326 is connected to the output of the PA 1350 via a parallel switch 1328 (instead of a coupler) on one side, and to an input of the LNA 1354 (instead of an output of the LNA) on the other side. This configuration of the DPD loopback path 1326 allows the test signal transmitted from the transmit chain 1324 to reach the LNA 1354 at a high blocker power level with a linear transmit signal, which may not be achieved with two couplers. The TX output signal is considered to be linear in this case, since the TX chain is designed to output far higher output power levels compared with the blocker signal level. In case where this is not true, TX DPD may be employed.

The test signal may be attenuated by the attenuator 1356 and then injected into the receive chain 1322a via the coupler 1352. The DPD interference canceller 1372 receives this test signal and may estimate the non-linear characteristics of the receive chain 1322a based on the received (distorted) test signal and the transmitted test signal.

Alternatively, the receiver's non-linearities may be characterized using two receive observations, e.g. observations at the main receive path 1322a (distorted signal) and at the auxiliary receive chain 1322b (i.e. the interference acquisition receive path (linear signal)). The auxiliary RX chain may be designed to be highly linear, such that the blocker signal will pass through it without considerable non-linear distortion. This may be easily achieved, as this chain is not required to be very low-noise (sensitive), as the main RX chain.

The non-linear impairments introduced by the receiver in the presence of the interference signal may be compensated (e.g. post-distortion in a digital domain) using the information obtained above (i.e. the interference reference signal and the non-linearity of the receive chain 1322a). This may effectively restore the receive signal quality to interference-free conditions. Once the interference signal and the receiver non-linearity model are known, this information may be used to post-distort (compensate) the received signal in digital domain, and this can effectively eliminate the interference-induced impairments.

The received signal including the non-linear products at the output of the ADC 1336a may be written as follows:

$$y(n) = \sum_{k=1}^{K_d}\sum_{q=0}^{Q_d} a_{kq}x_d(n-q)|x_d(n-q)|^{k-1} + \sum_{k=1}^{K_b}\sum_{q=0}^{Q_b} b_{kq}x_b(n-q)|x_b(n-q)|^{k-1},$$ Equation (17)

where $x_d$ and $x_b$ are the desired and blocker signals, respectively, $K_d$ and $K_b$ are constants representing the highest order of power of the desired and blocker signals, respectively, in the non-linear signal model, $Q_d$ and $Q_b$ are the memory depths (the number of samples used in history) of the desired signal and the blocker signal, respectively, and $a_{kq}/b_{kq}$ represent the non-linearities of the receiver.

With the acquired $x_b$ (the interference reference signal at the output of the interference acquisition unit 1370) and the receiver non-linearities ($a_{kq}/b_{kq}$), e.g. obtained based on the test signal, the non-linear terms in the received signal induced by the interference signal (e.g. a blocker signal) may be cancelled at the DPD interference canceller 1372 as follows:

$$z(n) = y(n) - \sum_{k=1}^{K_b}\sum_{q=0}^{Q_b} b_{kq}x_b(n-q)|x_b(n-q)|^{k-1}$$ Equation (18)

$$= \sum_{k=1}^{K_d}\sum_{q=0}^{X_d} a_{kq}x_d(n-q)|x_d(n-q)|^{k-1}.$$

In a matrixial form, Equation (18) may be written as follows:

$$z = A \cdot x_d.$$ Equation (19)

The least square solution of Equation (19) is:

$$x_d = (A^H A)^{-1} \cdot A^H z.$$ Equation (20)

With this cancellation, an undistorted desired signal may be obtained.

The above DPD model described above is merely an example and other DPD models may be employed (e.g. amplitude/amplitude (AM/AM) or amplitude/phase (AM/PM) distortion based-models).

In addition to the cancellation of the interference or impairments due to the non-linearities of the receiver as described above, interference or impairments caused by ADC clipping may also be cancelled or mitigated, for example using a filling algorithm. Since the sampling rate of the received signal is typically much higher than its bandwidth, the ADC output contains some redundant information/samples, which can be restored With this cancellation, the distortion introduced by ADC clipping may be reduced to a negligible level.

After cancellation of the interference or impairments above, the desired signal quality may be sufficient for proper detection. Additionally, interference or impairments caused by reciprocal mixing (i.e. down-conversion of the blocker by the LO's phase noise skirt, right on top of the desired signal at baseband) may also be cancelled.

Figure 14:
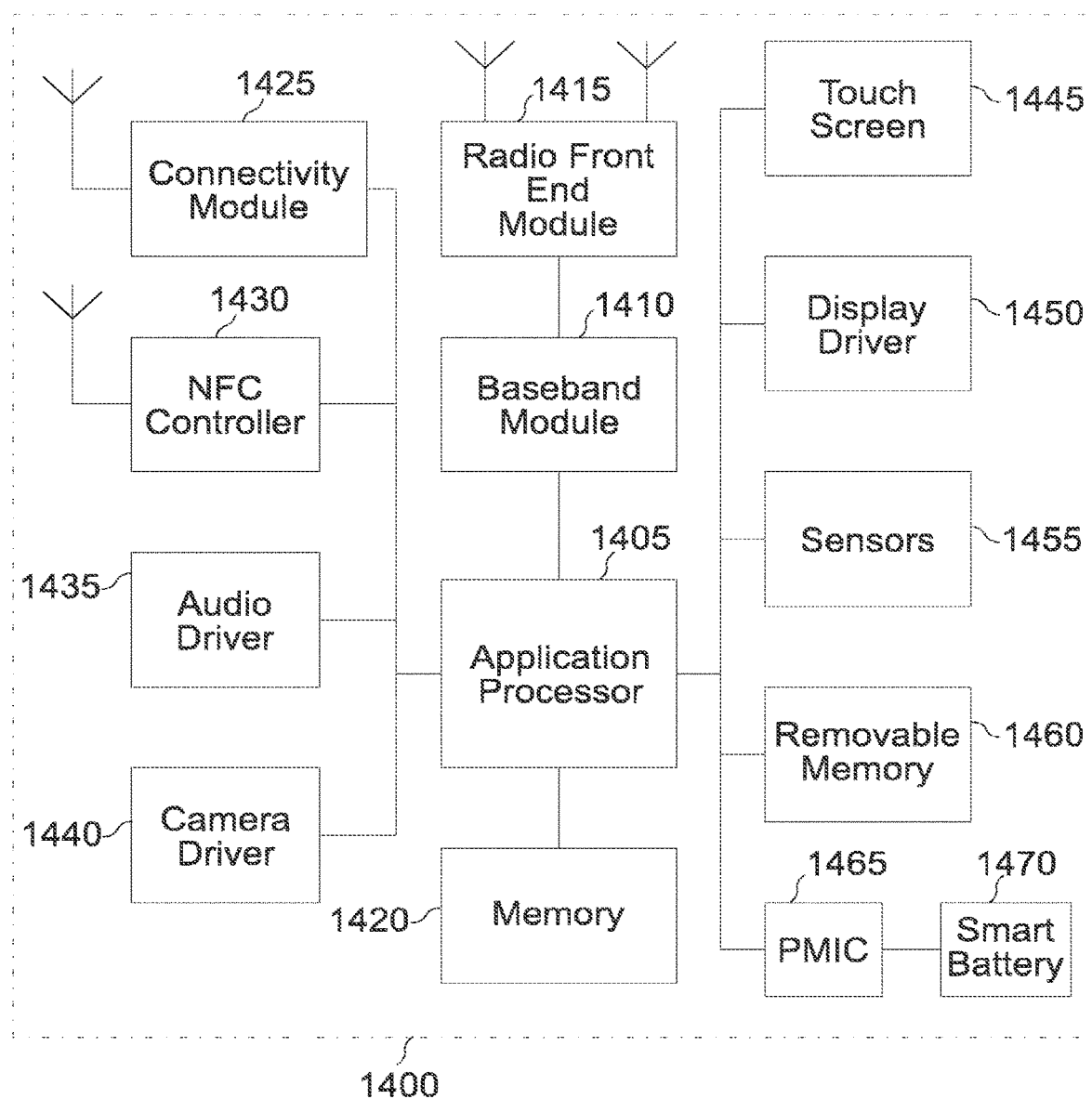
FIG. 14 illustrates a user device in which the examples disclosed herein may be implemented.

FIG. 14 illustrates a user device 1400 in which the examples disclosed herein may be implemented. The user device 1400 may be a mobile device in some aspects and includes an application processor 1405, baseband processor 1410 (also referred to as a baseband module), radio front end module (RFEM) 1415, memory 1420, connectivity module 1425, near field communication (NFC) controller 1430, audio driver 1435, camera driver 1440, touch screen 1445, display driver 1450, sensors 1455, removable memory 1460, power management integrated circuit (PMIC) 1465 and smart battery 1470.

In some aspects, application processor 1405 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (JO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 1410 may be implemented, for example, as a solder-down substrate including one or more integrated circuits, a single packaged integrated circuit soldered to a main circuit board, and/or a multi-chip module containing two or more integrated circuits.

Figure 15:
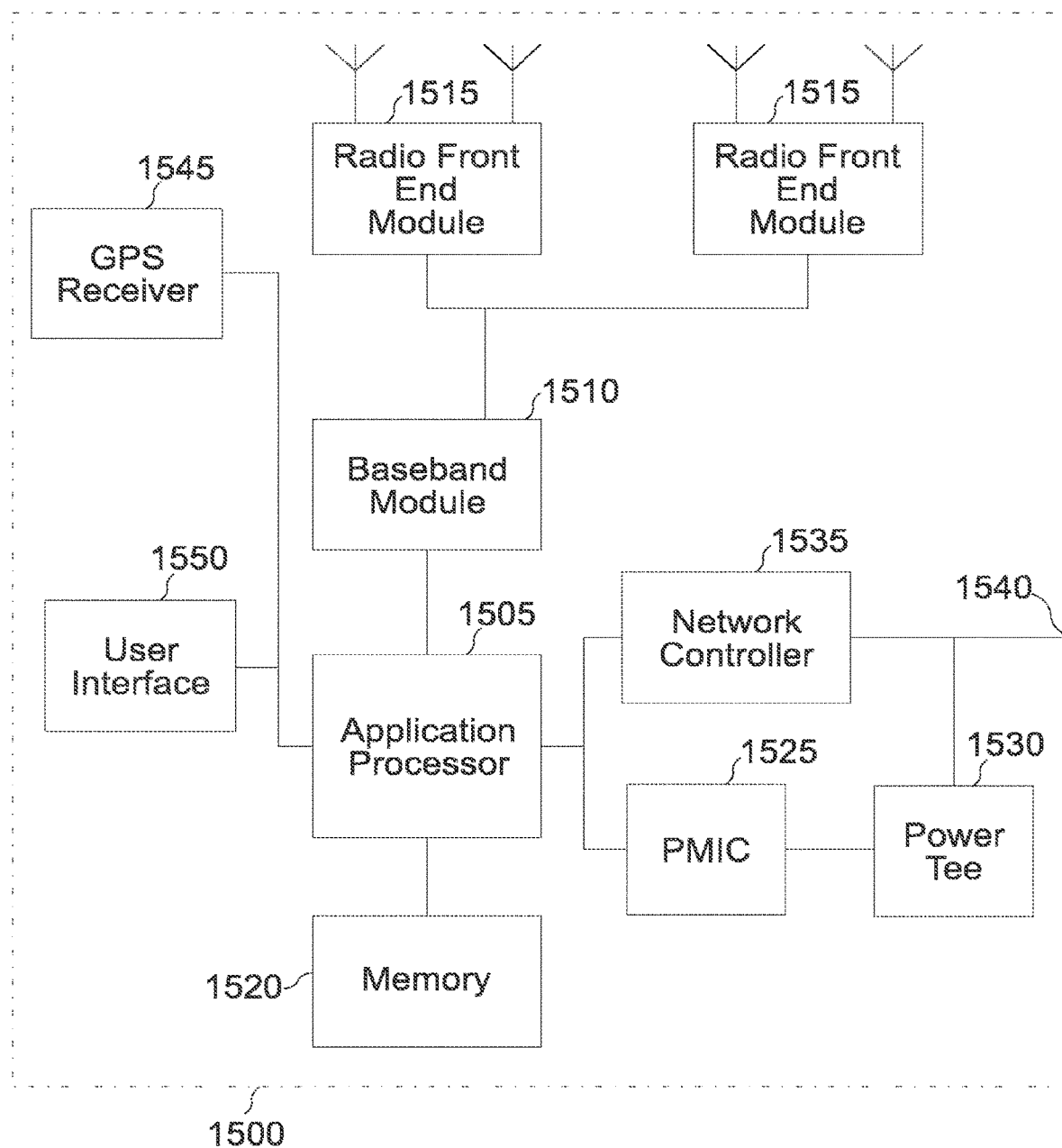
FIG. 15 illustrates a base station or infrastructure equipment radio head 1500 in which the examples disclosed herein may be implemented.

FIG. 15 illustrates a base station or infrastructure equipment radio head 1500 in which the examples disclosed herein may be implemented. The base station radio head 1500 may include one or more of application processor 1505, baseband modules 1510, one or more radio front end modules 1515, memory 1520, power management circuitry 1525, power tee circuitry 1530, network controller 1535, network interface connector 1540, satellite navigation receiver module 1545, and user interface 1550.

In some aspects, application processor 1505 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 1510 may be implemented, for example, as a solder-down substrate including one or more integrated circuits, a single packaged integrated circuit soldered to a main circuit board or a multi-chip module containing two or more integrated circuits.

In some aspects, memory 1520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 1520 may be implemented as one or more of solder down packaged integrated circuits, socketed memory modules and plug-in memory cards.

In some aspects, power management integrated circuitry 1525 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 1530 may provide for electrical power drawn from a network cable to provide both power supply and data connectivity to the base station radio head 1500 using a single cable.

In some aspects, network controller 1535 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 1545 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 1545 may provide data to application processor 1505 which may include one or more of position data or time data. Application processor 1505 may use time data to synchronize operations with other radio base stations.

In some aspects, user interface 1550 may include one or more of physical or virtual buttons, such as a reset button, one or more indicators such as light emitting diodes (LEDs) and a display screen.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is an apparatus for cancelling an interference in a received signal. The apparatus may include a first receive chain configured to process a received signal, wherein the first receive chain includes a first mixer configured to down-convert the received signal using a first local oscillator signal having a first frequency. The received signal includes a wanted signal and an unwanted signal. The apparatus further includes a second receive chain configured to process the received signal and generate an interference reference signal from the received signal, wherein the second receive chain includes a second mixer configured to down-convert the received signal using a second local oscillator signal having a second frequency. The apparatus further includes an interference canceller configured to cancel, in a digital domain, at least in part interference caused by non-linear characteristics of the first receive chain in a presence of the unwanted signal from the down-converted received signal by the first receive chain.

In example 2, the second receive chain may be one of a plurality of receive chains provided for receiving a signal for wireless communication in the apparatus.

In example 3, the second receive chain may be one of a plurality of receive chains provided for carrier aggregation in the apparatus.

In example 4, the received signal may be provided from the first receive chain to the second receive chain via a low noise amplifier coupling the first receive chain and the second receive chain.

In example 5, the received signal may be provided from the first receive chain to the second receive chain passively by electro-magnetic or capacitive coupling.

In example 6, the first local oscillator signal includes spurs caused by a third local oscillator signal used in a third receive chain, and the interference canceller may be configured to cancel interference caused by modulated spurs introduced by the spurs in the presence of the unwanted signal in the received signal.

In example 7, the unwanted signal may be a transmit signal transmitted by the apparatus and leaked on the first receive path.

In example 8, the unwanted signal is a third order counter intermodulation distortion generated from transmit signals at two or more carriers and leaked onto the first receive chain.

In example 9, the unwanted signal is an adjacent channel leakage of a transmit signal transmitted by the apparatus.

In example 10, the interference canceller is configured to cancel interference caused by a second order intermodulation distortion.

In example 11, the apparatus may further include a frequency synthesizer configured to generate the first local oscillator signal, and a digital-to-time converter configured to generate the second local oscillator signal by shifting a frequency of the first local oscillator signal.

In example 12, the apparatus may further include a coupler coupled both to the first receive chain and the second receive chain to supply the received signal to the first receive chain and the second receive chain.

In example 13, the apparatus may further include a transmit chain configured to transmit a signal, and a loopback path for coupling an output of the transmit chain to an input of the first receive chain, wherein the interference canceller is configured to estimate the non-linear characteristics of the first receive chain based on a test signal transmitted by the transmit chain.

In example 14, the loopback path may be coupled to an output of a power amplifier in the transmit chain via a switch and coupled to an input of a low noise amplifier in the first receive chain via the coupler.

In example 15, the interference canceller may be configured to estimate the non-linear characteristics of the first receive chain based on the test signal received at the first receive chain and the second receive chain.

Example 16 is a method for cancelling interference from a received signal. The method includes receiving a signal using a first receive chain, activating a second receive chain that is in an inactive state, capturing the received signal on the first receive chain onto the second receive chain, processing the received signal on the first receive chain, wherein the first receive chain includes a first mixer configured to down-convert the received signal using a first local oscillator signal having a first frequency, wherein the received signal includes a wanted signal and an unwanted signal, processing the received signal on the second receive chain and generating an interference reference signal from the received signal, wherein the second receive chain includes a second mixer configured to down-convert the received signal using a second local oscillator signal having a second frequency, and cancelling, in a digital domain, at least in part interference caused by non-linear characteristics of the first receive chain in a presence of the unwanted signal from the down-converted received signal by the first receive chain.

In example 17, in the method of example 16, the second receive chain may be one of a plurality of receive chains provided for carrier aggregation.

In example 18, in the method of example 16 or 17, the received signal may be provided from the first receive chain to the second receive chain via a low noise amplifier coupling the first receive chain and the second receive chain.

In example 19, in methods of any one of examples 16-17, the received signal may be provided from the first receive chain to the second receive chain passively by electromagnetic or capacitive coupling.

In example 20, in methods as in any one of examples 16-19, the first local oscillator signal includes spurs caused by a third local oscillator signal used in a third receive chain, and the interference canceller is configured to cancel interference caused by modulated spurs introduced by the spurs in the presence of the unwanted signal in the received signal.

In example 21, in methods as in any one of examples 16-20, the first local oscillator signal is generated by a frequency synthesizer and the second local oscillator signal is generated by a digital-to-time converter by shifting a frequency of the first local oscillator signal.

In example 22, the methods as in any one of examples 16-21 may further include transmitting a test signal from a transmit chain, receiving the test signal at the first receive chain via a loopback path coupling an output of the transmit chain to an input of the first receive chain, and estimating non-linear characteristics of the first receive chain based on the test signal, wherein the interference is cancelled based on the non-linear characteristics of the first receive path.

In example 23, in the method of example 22, the loopback path may be coupled to an output of a power amplifier in the transmit chain via a switch and coupled to an input of a low noise amplifier in the first receive chain via a coupler coupled both to the first receive chain and the second receive chain to supply the received signal to the first receive chain and the second receive chain.

Example 24 is a machine-readable storage including machine readable instructions, when executed, to implement a method or realize an apparatus as in any one of examples 1-23.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th" may be implemented as a "means configured to or suited for s.th" such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for cancelling an interference in a received signal, comprising:
   a first receive chain configured to process a received signal, wherein the first receive chain includes a first low noise amplifier for amplifying the received signal and a first mixer configured to down-convert the amplified received signal using a first local oscillator signal having a first frequency, wherein the received signal includes a wanted signal and an unwanted signal;
   a second receive chain configured to process the received signal and generate an interference reference signal from the received signal, wherein the second receive chain includes a second low noise amplifier for amplifying the received signal and a second mixer configured to down-convert the amplified received signal using a second local oscillator signal having a second frequency; and
   an interference canceller configured to cancel, in a digital domain, at least in part interference caused by non-linear characteristics of the first receive chain in a presence of the unwanted signal from the down-converted received signal by the first receive chain,
   wherein the second receive chain is one of a plurality of receive chains provided for receiving a signal for wireless communication in the apparatus,
   wherein the received signal is provided from the first receive chain to the second receive chain via a third low noise amplifier coupling the first receive chain and the second receive chain, by a capacitive coupling effect via package balls or pins connecting the first receive chain and the second receive chain to a printed circuit board, respectively, or by electro-magnetic coupling between matching coils provided to the first low noise amplifier and the second low noise amplifier.

2. The apparatus of claim 1, wherein the second receive chain is one of a plurality of receive chains provided for carrier aggregation in the apparatus.

3. The apparatus of claim 1, wherein the first local oscillator signal includes spurs caused by a third local oscillator signal used in a third receive chain, and the interference canceller is configured to cancel interference caused by modulated spurs introduced by the spurs in the presence of the unwanted signal in the received signal.

4. The apparatus of claim 3, wherein the unwanted signal is a transmit signal transmitted by the apparatus and leaked on the first receive path.

5. The apparatus of claim 3, wherein the unwanted signal is a third order counter intermodulation distortion generated from transmit signals at two or more carriers and leaked onto the first receive chain.

6. The apparatus of claim 3, wherein the unwanted signal is an adjacent channel leakage of a transmit signal transmitted by the apparatus.

7. The apparatus of claim 1, wherein the interference canceller is configured to cancel interference caused by a second order intermodulation distortion.

8. The apparatus of claim 1, further comprising:
   a frequency synthesizer configured to generate the first local oscillator signal; and
   a digital-to-time converter configured to generate the second local oscillator signal by shifting a frequency of the first local oscillator signal.

9. The apparatus of claim 8, further comprising:
   a coupler coupled both to the first receive chain and the second receive chain to supply the received signal to the first receive chain and the second receive chain.

10. The apparatus of claim 9, further comprising:
    a transmit chain configured to transmit a signal; and
    a loopback path for coupling an output of the transmit chain to an input of the first receive chain, wherein the interference canceller is configured to estimate the non-linear characteristics of the first receive chain based on a test signal transmitted by the transmit chain.

11. The apparatus of claim 10, wherein the loopback path is coupled to an output of a power amplifier in the transmit chain via a switch and coupled to an input of a low noise amplifier in the first receive chain via the coupler.

12. The apparatus of claim 10, wherein the interference canceller is configured to estimate the non-linear characteristics of the first receive chain based on the test signal received at the first receive chain and the second receive chain.

13. A method for cancelling interference from a received signal, comprising:
    receiving a signal using a first receive chain;
    activating a second receive chain that is in an inactive state;
    capturing the received signal on the first receive chain onto the second receive chain;
    processing the received signal on the first receive chain, wherein the first receive chain includes a first low noise amplifier for amplifying the received signal and a first mixer configured to down-convert the amplified received signal using a first local oscillator signal having a first frequency, wherein the received signal includes a wanted signal and an unwanted signal;
    processing the received signal on the second receive chain and generating an interference reference signal from the received signal, wherein the second receive chain includes a second low noise amplifier for amplifying the received signal and a second mixer configured to down-convert the amplified received signal using a second local oscillator signal having a second frequency; and
    cancelling, in a digital domain, at least in part interference caused by non-linear characteristics of the first receive chain in a presence of the unwanted signal from the down-converted received signal by the first receive chain,
    wherein the second receive chain is one of a plurality of receive chains provided for receiving a signal for wireless communication in an apparatus, and
    wherein the received signal is provided from the first receive chain to the second receive chain via a third low noise amplifier coupling the first receive chain and the second receive chain, by a capacitive coupling effect via package balls or pins connecting the first receive chain and the second receive chain to a printed circuit board, respectively, or by electro-magnetic coupling between matching coils provided to the first low noise amplifier and the second low noise amplifier.

14. The method of claim 13, wherein the second receive chain is one of a plurality of receive chains provided for carrier aggregation.

15. The method of claim 13, wherein the first local oscillator signal includes spurs caused by a third local oscillator signal used in a third receive chain, and the interference canceller is configured to cancel interference caused by modulated spurs introduced by the spurs in the presence of the unwanted signal in the received signal.

16. The method of claim 13, wherein the first local oscillator signal is generated by a frequency synthesizer and the second local oscillator signal is generated by a digital-to-time converter by shifting a frequency of the first local oscillator signal.

17. The method of claim 13, further comprising:
- transmitting a test signal from a transmit chain;
- receiving the test signal at the first receive chain via a loopback path coupling an output of the transmit chain to an input of the first receive chain; and
- estimating non-linear characteristics of the first receive chain based on the test signal, wherein the interference is cancelled based on the non-linear characteristics of the first receive path.

18. The method of claim 17, wherein the loopback path is coupled to an output of a power amplifier in the transmit chain via a switch and coupled to an input of a low noise amplifier in the first receive chain via a coupler coupled both to the first receive chain and the second receive chain to supply the received signal to the first receive chain and the second receive chain.

19. A non-transitory machine-readable storage including machine readable instructions, when executed, to implement a method of claim 13.

\* \* \* \* \*